(12) United States Patent
Zhang

(10) Patent No.: US 12,422,449 B2
(45) Date of Patent: Sep. 23, 2025

(54) SAMPLE ANALYSIS SYSTEM AND SAMPLE ANALYSIS METHOD

(71) Applicant: Shenzhen Mindray Bio-Medical Electronics Co., Ltd., Shenzhen (CN)

(72) Inventor: Junwei Zhang, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 784 days.

(21) Appl. No.: 17/554,803

(22) Filed: Dec. 17, 2021

(65) Prior Publication Data

US 2022/0107333 A1 Apr. 7, 2022

Related U.S. Application Data

(63) Continuation of application No. PCT/CN2019/093897, filed on Jun. 28, 2019.

(51) Int. Cl.
*G01N 35/04* (2006.01)
*G01N 35/00* (2006.01)
*G01N 35/02* (2006.01)

(52) U.S. Cl.
CPC ....... *G01N 35/04* (2013.01); *G01N 35/00732* (2013.01); *G01N 35/026* (2013.01); *G01N 2035/0465* (2013.01); *G01N 2035/0496* (2013.01)

(58) Field of Classification Search
CPC ............. G01N 35/04; G01N 35/00732; G01N 35/026; G01N 2035/0465; G01N 2035/0496; G01N 2035/00801; G01N 2035/00831; G01N 2035/041; G01N 2035/0462
See application file for complete search history.

(56) References Cited

U.S. PATENT DOCUMENTS

| 2008/0069730 A1 | 3/2008 | Itoh | |
| 2014/0037517 A1* | 2/2014 | Takai | B65G 65/00 209/552 |

(Continued)

FOREIGN PATENT DOCUMENTS

| CN | 1637418 A | 7/2005 |
| CN | 101218493 A | 7/2008 |

(Continued)

*Primary Examiner* — John McGuirk
(74) *Attorney, Agent, or Firm* — Syncoda LLC; Feng Ma

(57) ABSTRACT

Sample analysis system and method are provided. The sample analysis system includes a first sample analyzer, a second sample analyzer, a sample rack transport device, and a sample sorting device provided between the first and second sample analyzers. The sample rack transport device includes a transport track for conveying a sample rack with sample containers to the first and/or second sample analyzer for testing. The first and second sample analyzers are arranged in sequence along a first transport direction of the transport track. The sample sorting device includes a connecting track, a sorting platform, and a sample transfer mechanism. The sample transfer mechanism is capable of moving to a position above the connecting track, so as to transfer the sample container(s) in the sample rack conveyed to the connecting track to a sample rack on the sorting platform. Efficiency of sample analysis is improved.

16 Claims, 8 Drawing Sheets

(56) References Cited

U.S. PATENT DOCUMENTS

| | | | |
|---|---|---|---|
| 2015/0153369 A1* | 6/2015 | Giovanoli | G01N 35/0099 435/6.12 |
| 2015/0298321 A1* | 10/2015 | Gross | B65G 11/023 422/67 |
| 2018/0003730 A1* | 1/2018 | Watanabe | A61J 1/14 |
| 2019/0049476 A1 | 2/2019 | Zhang et al. | |

FOREIGN PATENT DOCUMENTS

| | | |
|---|---|---|
| CN | 101852797 A | 10/2010 |
| CN | 102151661 A | 8/2011 |
| CN | 103575922 A | 2/2014 |
| CN | 103983797 A | 8/2014 |
| CN | 105479461 A | 4/2016 |
| CN | 105505762 A | 4/2016 |
| CN | 205290952 U | 6/2016 |
| CN | 106370873 A | 2/2017 |
| CN | 106926276 A | 7/2017 |
| CN | 107300624 A | 10/2017 |
| CN | 107850611 A | 3/2018 |
| CN | 208172799 U | 11/2018 |
| CN | 109290219 A | 2/2019 |
| CN | 109406812 A | 3/2019 |
| CN | 208621629 U | 3/2019 |
| JP | 2002040034 A | 2/2002 |
| WO | 9503548 A1 | 2/1995 |
| WO | WO 2017177466 A1 | 10/2017 |
| WO | 2019075704 A1 | 4/2019 |

* cited by examiner

SAMPLE ANALYSIS SYSTEM AND SAMPLE ANALYSIS METHOD

CROSS-REFERENCE TO RELATED APPLICATIONS

This application is a continuation of International Application No. PCT/CN2019/093897, filed Jun. 28, 2019, the content of which is incorporated herein by reference.

TECHNICAL FIELD

The present disclosure relates to the field of medical tests, and in particular to a sample analysis system and a sample analysis method.

BACKGROUND

In the field of medical diagnosis, with the increasing degree of automation of test laboratories, sample analysis equipments are used for detecting components in samples, such as blood samples, and sample containers are typically loaded in a sample rack and transported by tracks or belts to realize detection operation in a flow line. By associating multiple sample analysis instruments with each other in a flow line, centralized management and scheduling of all samples can be achieved, thus improving the efficiency of sample analysis.

In the existing sample analysis system of a flow-line type, samples in sample containers on a same sample rack may need to be tested for various items. For example, a same sample container or different sample containers on a sample rack may need to be conveyed to different sample analyzers for testing. Specifically, a first sample container on a sample rack needs to be conveyed to a first sample analyzer for testing, a second sample container on said sample rack needs to be conveyed to a second sample analyzer for testing, and a third sample container on said sample rack needs to be conveyed to both the first sample analyzer and the second sample analyzer for testing. However, in the sample analysis system of a flow-line type, sample containers are placed in sample racks for conveying. Only after one sample rack is conveyed to one sample analyzer for testing corresponding sample containers, said sample rack can be conveyed to a next sample analyzer for testing corresponding sample containers, so that sample racks tend to be detained on the sample rack transport device, thereby causing traffic jams, and the overall efficiency of the sample analysis system is low.

In addition, as different sample analyzers vary in sample analysis speed, it is more likely that sample racks will be detained on the sample rack transport device, which leads to traffic jam in the flow line, before a sample analyzer with a slow analysis speed, such as a C-reaction protein (CRP) analyzer, a slide staining and smearing machine or a glycosylated hemoglobin analyzer.

Moreover, the measurement principle of the glycosylated hemoglobin analyzer is high pressure liquid chromatography (HPLC). HPLC is a high-pressure liquid chromatography method, which is the gold standard for glycosylated hemoglobin analysis. With accurate test results and high speed, it is a preferred instrument for most high-end laboratories. However, HPLC uses reagents to keep a high pressure system (tens of kilograms of pressure) at all times to realize separation based on the difference in positive charges between different components. Therefore, once the testing for glycosylated hemoglobin analysis is discontinuous, the waste of reagents would be multiplied, thereby increasing the measurement cost.

SUMMARY

A sample analysis system and a sample analysis method are provided for solving at least one of the problems existing in the current flow-line sample analysis system, so as to improve the sample analysis efficiency of the sample analysis system.

In a first aspect, the disclosure provides a sample analysis system, comprising a first sample analyzer, a second sample analyzer, a sample rack transport device, and a sample sorting device,
  wherein the sample rack transport device is provided with a transport track and is configured to convey a sample rack with at least one sample container placed therein to the first sample analyzer and/or the second sample analyzer for testing, and the first sample analyzer and the second sample analyzer are sequentially arranged along a first conveying direction of the transport track; and
  wherein the sample sorting device is arranged between the first sample analyzer and the second sample analyzer, and the sample sorting device comprises:
  a connecting track parallelly connected to the transport track, such that the sample rack with the at least one sample container placed therein can be conveyed from the transport track to the connecting track or from the connecting track to the transport track,
  a sorting platform configured for placing at least one sample rack and having an entrance for the sample rack placed on the sorting platform to enter the connecting track or for the sample rack on the connecting track to enter the sorting platform, and
  a sample transfer mechanism, which is arranged above the sorting platform and is capable of moving to a position above the connecting track, so as to transfer the sample container(s) in the sample rack, which is conveyed to the connecting track, to the sample rack on the sorting platform.

In a second aspect, the disclosure further provides a sample analysis system comprising a plurality of sample analyzers, a sample rack transport device, an unloading platform, and a sample sorting device,
  wherein the sample rack transport device is provided with a transport track and is configured to convey a sample rack with at least one sample container placed therein to at least one of the plurality of sample analyzers for testing, the plurality of sample analyzers and the unloading platform are sequentially arranged along a first conveying direction of the transport track, and the sample sorting device is arranged upstream or downstream of the unloading platform along the first conveying direction and is configured to sort the at least one sample container in the sample rack that has been tested by the at least one of the plurality of sample analyzers, the sample sorting device comprising:
  a connecting track parallelly connected to the transport track, such that the sample rack with the at least one sample container placed therein can be conveyed from the transport track to the connecting track or from the connecting track to the transport track,
  a sorting platform configured for placing at least one sample rack to load the sample container(s), and
  a sample transfer mechanism, which is arranged above the sorting platform and is capable of moving to a position above the connecting track, so as to transfer the sample container(s) in the sample rack, which is conveyed to the connecting track, to the sample rack on the sorting platform; and the unloading platform is configured to receive the sample rack that has been sorted by the sample sorting device.

In a third aspect, the disclosure further provides a sample analysis method, which is applied to a sample analysis system comprising a first sample analyzer, a second sample analyzer, a sample rack transport device, and a sample sorting device, wherein the sample rack transport device is provided with a transport track and is configured to convey a sample rack with at least one sample container placed therein to the first sample analyzer and/or the second sample analyzer for testing, the first sample analyzer and the second sample analyzer are sequentially arranged along a first conveying direction of the transport track, and the sample sorting device is arranged between the first sample analyzer and the second sample analyzer;

the sample analysis method comprising:
conveying, by the transport track, a sample rack with a sample container to be sorted placed therein to a connecting track of the sample sorting device; and
transferring, by a sample transfer mechanism of the sample sorting device, the sample container to be sorted to a target sample rack on a sorting platform of the sample sorting device.

In a fourth aspect, the disclosure further provides a sample analysis method, which is applied to a sample analysis system comprising a plurality of sample analyzers, a sample rack transport device, an unloading platform, and a sample sorting device, wherein the sample rack transport device is provided with a transport track and is configured to convey a sample rack with at least one sample container placed therein to at least one sample analyzer of the plurality of sample analyzers for testing, the plurality of sample analyzers and the unloading platform are sequentially arranged along a first conveying direction of the transport track, and the sample sorting device is arranged upstream or downstream of the unloading platform along the first conveying direction and is configured to sort the at least one sample container in the sample rack that has been tested by the at least one of the plurality of sample analyzers;

the sorting method comprising:
conveying, by the transport track, a sample rack with a sample container to be sorted placed therein to a connecting track of the sample sorting device;
transferring, by a sample transfer mechanism of the sample sorting device, the sample container to be sorted to a target sample rack on a sorting platform of the sample sorting device; and
conveying, by the connecting track, the sample rack that has been sorted to the transport track so as to convey the sample rack from the transport track to the unloading platform.

According to the disclosure, by arranging the sample sorting device between the first sample analyzer and the second sample analyzer, sample containers on the sample rack conveyed to the connecting track can be sorted, for example, sample containers that need to be conveyed to the second sample analyzer for testing are collected in one and the same sample rack, so as to reduce detainment time of sample racks in the sample rack transport device and avoid "jams" in the sample analysis system, thus improving the efficiency of the sample analysis system.

DETAILED DESCRIPTION

In order to make the purposes, technical solutions and advantages of the embodiments of the present application clearer, the technical solutions of the embodiments of the present application will be described below clearly and comprehensively in conjunction with the drawings of the embodiments of the present application. The embodiments described herein are merely some embodiments of the present application and are not all the possible embodiments. Based on the embodiments in the present application, all other embodiments that would be derived by those of ordinary skill in the art without involving any inventive effort shall all fall within the scope of protection of the present application.

Routine tests are typically required for samples, such as blood routine tests which are realized in a hematology analyzer. However, samples with certain characteristics, for example, samples that require re-examination for blood routine, CRP test, smearing or glycosylated hemoglobin test, need to be tested in other instruments, while samples that no longer need to be tested for other items are conveyed to an unloading area. Because samples that need to be tested differently are processed differently, it is necessary to sort the samples for separate processing.

Figure 1:
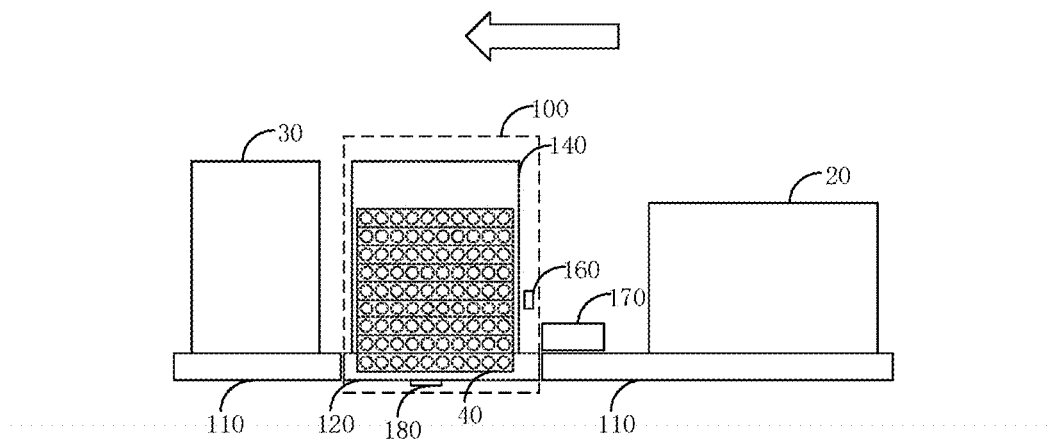
FIGS. 1-5 are schematic structure diagrams of sample analysis systems according to embodiments of the disclosure.

FIG. 1 is a schematic structure diagram of a sample analysis system according to a first embodiment of the disclosure. Referring to FIG. 1, this embodiment provides a sample analysis system, which mainly comprises a first sample analyzer 20, a second sample analyzer 30, a sample rack transport device, and a sample sorting device 100.

The sample rack transport device has a transport track 110 and is connected to the first sample analyzer 20 and the second sample analyzer 30. The sample rack transport device is configured to convey a sample rack 40 with at least one sample container placed therein to the first sample analyzer 20 and/or the second sample analyzer 30 for testing, the first sample analyzer 20 and the second sample analyzer 30 are sequentially arranged along a first conveying direction of the transport track 110. The sample sorting device 100 is arranged between the first sample analyzer 20 and the second sample analyzer 30. The first conveying direction is indicated by a hollow arrow in FIG. 1.

In an embodiment of the disclosure, the sample rack 40 may be conveyed to the first sample analyzer 20 and the second sample analyzer 30 in sequence by the sample rack transport device.

In an embodiment of the disclosure, the sample sorting device 100 mainly comprises a connecting track 120, a sorting platform 140, and a sample transfer mechanism 160. The connecting track 120 is parallelly, especially coaxially connected to the transport track 110, such that the sample rack 40 with the at least one sample container placed therein can be conveyed from the transport track 110 to the connecting track 120 and from the connecting track 120 to the transport track 110.

In other embodiments of the disclosure, the connecting track 120 may allow the sample rack 40 conveyed on the transport track 110 to pass through directly. For example, when the sample rack 40 conveyed from the transport track 110 to the connecting track 120 contains no sample container to be sorted, the sample rack 40 will not stay on the connecting track 120, but is directly conveyed to the transport track 110 downstream via the connecting track 120.

In some embodiments, the connecting track 120 may be connected to the transport track 110 at two ends, respectively, as shown in FIG. 1, or the connecting track 120 may be a part of the transport track 110.

The sorting platform 140 is configured for placing at least one sample rack 40, typically empty sample rack, and has an entrance for the sample rack 40 on the sorting platform 140 to enter the connecting track 120 or for the sample rack 40 on the connecting track 120 to enter the sorting platform 140.

The sample transfer mechanism 160 is arranged above the sorting platform 140. The sample transfer mechanism 160 is capable of moving to a position above the connecting track 120, so as to transfer the sample container(s) in the sample rack 40, which is conveyed to the connecting track 120, to the sample rack 40 on the sorting platform 140.

In the embodiments of the disclosure, one and the same sample container on one sample rack may need to be conveyed to different sample analyzers for testing or different sample containers on one sample rack may need to be conveyed to different sample analyzers for testing. Therefore, the sample sorting device 100 is arranged between the first sample analyzer 20 and the second sample analyzer 30, and sample containers in the sample rack on the connecting track 120, especially sample containers that need to be conveyed to the second sample analyzer 30 for testing, are transferred to the sample rack 40 on the sorting platform 140. That is, in the embodiments of the disclosure, sample containers in the sample rack are sorted by the sample sorting device, and sample containers that need to be conveyed to one and the same sample analyzer, such as the second sample analyzer, are collected in one and the same sample rack, which can reduce detainment time of sample racks in the sample rack transport device and avoid "jams" in the sample analysis system, thus improving the efficiency of the sample analysis system.

In an embodiment of the disclosure, the sample sorting device 100 may further comprise a first identifier 4 (not shown in FIG. 1) for identifying sample containers. As will be described in detail below, the first identifier 4 moves horizontally in synchronization with the sample transfer mechanism 160 to identify identity information of the sample container currently transferred by the sample transfer mechanism. Therefore, according to the identity information of the currently transferred sample container, the sample transfer mechanism 160 can transfer the sample container to the sample rack corresponding to the identity information thereof.

In the embodiment of the disclosure, the first identifier 4 is capable of moving horizontally in synchronization with the sample transfer mechanism 160, so that the identity information of the sample container can be identified in the transfer process, without transferring the sample container to a specific area for identification, thus reducing the time for identifying the identity information and improving the sorting efficiency of the sample sorting device, and then improving the efficiency of the sample analysis system.

In an embodiment of the disclosure, the sample sorting device 100 may further comprise a second identifier 170, which is arranged on one side of the entrance of the sample sorting device 100. The second identifier 170 is arranged at an effective position for identifying the sample rack 40 which is about to enter the connecting track 120. For example, the second identifier is arranged before or after the sample sorting device 100.

The second identifier 170 may be a barcode scanner, and the second identifier 170 may be installed at a position that enables it to directly face a barcode on a side or front face of the sample rack. Alternatively, the second identifier 170 may be an RFID electronic tag identification device, in which case, the installation position of the second identifier is flexible, as long as the installation position allows detection of sample racks 40 conveyed on the transport track 110 or the connecting track 120 in a distinguishing manner.

In an embodiment of the disclosure, the second identifier identifies sample rack identity information of the sample rack, which is to be conveyed to the connecting track 120, so that it can be determined in advance whether sample containers in the sample rack need to be sorted. If sorting is not required, the sample rack can be directly passed through the connecting track 120 to a next sample analyzer or an unloading area of the sample analysis system, or to be performed for other processing, which can reduce the workload of the sample sorting system and improve the processing efficiency.

In an embodiment of the disclosure, the sample sorting device 100 may further comprise a loading mechanism 1600 (not shown in FIG. 1) for pushing the sample rack 40 on the sorting platform 140 towards or away from the connecting track 120, and the loading mechanism 1600 will be described in detail later with reference to FIG. 10.

In an embodiment of the disclosure, the sample sorting device 100 may further comprise an in-position detection mechanism 180 for detecting whether a sample rack has been conveyed from the sorting platform 140 to the connecting track 120. In one embodiment, the in-position detection mechanism 180 comprises a contact and a detection optocoupler (not shown in FIG. 1). The contact is arranged on one side of the connecting track 120 away from the sorting platform 140 and is rotatable to enable an end portion of the contact to rotate into or out of a space above the connecting track 120. The sample rack 40 moves from the sorting platform 140 to the connecting track 120 and comes into contact with the end portion of the contact, and the contact rotates and triggers the detection optocoupler.

In one embodiment, the contact may have an arc-shaped hook structure.

In addition, the in-position detection mechanism may further comprise a pushing mechanism for pushing the sample rack 40 on the connecting track 120 towards the sorting platform 140. The pushing mechanism may be an electric push rod device, so as to cooperate with the loading mechanism of the sample sorting device 100 to position the sample rack 40 on the connecting track 120. Specifically, the pushing mechanism pushes the sample rack on the connecting track 120 to move towards the sorting platform 140 such that the in-position detection optocoupler is not blocked; and then, the loading mechanism moves to the rear of all the sample racks on the sorting platform and pushes all the sample racks from the rear-most sample rack towards the connecting track 120 until the sample rack on the connecting track 120 comes into contact with the in-position detection optocoupler, which triggers the blocking. At this time, all the sample racks on the sorting platform are closely attached to each other in sequence and attached to the sample rack on the connecting track 120, and the sample transfer mechanism transfers sample containers in the sample rack on the connecting track 120 to the sample racks on the sorting platform.

In an embodiment of the disclosure, the transport track 110 may be a bidirectional transport track for conveying the sample rack 40 in the first conveying direction or in a second conveying direction opposite to the first conveying direction. Therefore, the space occupied by the whole sample rack transport device can be reduced, and thus the cost is reduced. Of course, in other embodiments, the sample rack transport device may also comprise another transport track for conveying the sample rack 40 in a second conveying direction opposite to the first conveying direction.

In an embodiment of the disclosure, the sample rack transport device may further comprise a first loading buffer area, a first loading mechanism, a first feeding channel, a first unloading buffer area, and a first unloading mechanism (not shown) which correspond to the first sample analyzer 20. The first loading buffer area is positioned between the transport track 110 and the first feeding channel and is configured to store at least one sample rack 40. The first loading mechanism is configured to convey the sample rack 40 on the transport track 110 to the first loading buffer area for storage, or convey the sample rack 40 stored in the first loading buffer area to the first feeding channel. The first feeding channel is parallel to the transport track, and the first sample analyzer performs testing on the sample rack conveyed to the first feeding channel. The first unloading buffer area is positioned between the transport track and the first feeding channel and is configured to store at least one sample rack. The first unloading mechanism is configured to convey the sample rack 40 in the first feeding channel to the first unloading buffer area for storage, or convey the sample rack 40 stored in the first unloading buffer area to the transport track. Similarly, the sample rack transport device may further comprise a second loading buffer area, a second loading mechanism, a second feeding channel, a second unloading buffer area, and a second unloading mechanism (not shown) which correspond to the second sample analyzer 30.

A detailed structure of the sample rack transport device according to an embodiment of the disclosure is disclosed in PCT applications WO 2017177466 A1 and WO 2019075704 A1 of the applicant, the disclosures of which are herein incorporated by reference. The sample rack transport device according to an embodiment of the disclosure may also be implemented by other structures with the same or similar functions, and will not be described in detail here.

In an embodiment of the disclosure, the sample analysis system may further comprise a loading platform (not shown) arranged upstream of the first sample analyzer in the first conveying direction of the transport track, and an unloading platform (not shown) arranged downstream of the second sample analyzer in the first conveying direction of the transport track. The loading platform is configured to receive sample racks with sample containers to be tested placed therein, and the unloading platform is configured to receive sample racks with sample containers having completed all tests placed therein.

In an embodiment of the disclosure, the first sample analyzer 20 may be a hematology analyzer, and the second sample analyzer 30 may be a C-reactive protein analyzer or a slide staining and smearing machine or a glycosylated hemoglobin analyzer. Since the analysis time of a hematology analyzer is relatively short, while the analysis time of the C-reactive protein, the slide staining and smearing machine or the glycosylated hemoglobin analyzer is relatively long, the sample sorting device is provided downstream of the hematology analyzer and upstream of the C-reactive protein analyzer or slide staining and smearing machine or glycosylated hemoglobin analyzer, so that the sample sorting device can collected sample containers that have been tested by the hematology analyzer and need to be conveyed to the second sample analyzer in a designated sample rack B and cause the designated sample rack B to leave the sample sorting device for the target sample analyzer, thus improving the efficiency of the sample analysis system according to the embodiments of the disclosure. For example, there are thirty sample containers that have been tested by the first sample analyzer, of which only ten sample containers need to be conveyed to the second sample analyzer. If these thirty sample containers are dispersively placed in three sample racks, namely sample racks B1, B2, and B3, these three sample racks must be passed through the second sample analyzer in sequence, resulting in a decrease in the efficiency of the sample analysis system. In the embodiments of the disclosure, after sample sorting, the ten sample containers that need to be conveyed to the second sample analyzer are all placed in the sample rack B1, and the sample rack B1 is then conveyed to the second sample analyzer. Because of the relatively high sorting speed of the sample sorting device and the relatively low analysis speed of the second sample analyzer, the sample sorting will not affect the overall efficiency. Since only one sample rack B1 enters the second sample analyzer after sorting, the efficiency of the sample analysis system can be improved.

In an embodiment of the disclosure, the first sample analyzer 20 may alternatively be a C-reactive protein analyzer, and the second sample analyzer 30 may be a slide staining and smearing machine or a glycosylated hemoglobin analyzer. Similarly, because the analysis speed of the slide staining and smearing machine or the glycosylated hemoglobin analyzer is slower than that of the C-reactive protein analyzer and for example the requirement for the report output time of the glycosylated hemoglobin analyzer is not high, by arranging the sample sorting device between the first sample analyzer 20 and the second sample analyzer 30 and collecting sample containers to be conveyed to the second sample analyzer 30 in one and the same sample rack, the utilization rate of the second sample analyzer 30, such as the slide staining and smearing machine or the glycosylated hemoglobin analyzer, can be improved, the reagent consumption of the glycosylated hemoglobin analyzer can be reduced, and moreover, the efficiency of the sample analyzer system can be improved, preventing traffic jams in the sample rack transport device.

In an embodiment of the disclosure, the first sample analyzer 20 may alternatively be a slide staining and smearing machine, the second sample analyzer 30 may be a glycosylated hemoglobin analyzer, and the sample sorting device is provided between the slide staining and smearing machine and the glycosylated hemoglobin analyzer.

Figure 2:
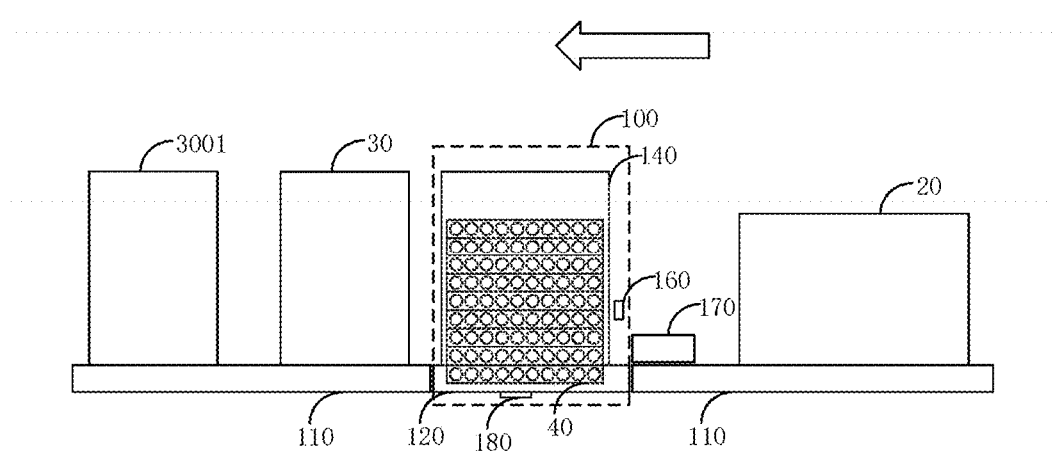

FIG. 2 is a schematic structure diagram of a sample analysis system according to a second embodiment of the disclosure. Different from the sample analyzer system shown in FIG. 1, this embodiment further comprises a third sample analyzer 3001 in addition to the first sample analyzer 20 and the second sample analyzer 30. The first sample analyzer 20, the second sample analyzer 30, and the third sample analyzer 3001 are sequentially arranged along the first conveying direction of the transport track 110. The sample rack 40 can be conveyed to the first sample analyzer 20, the second sample analyzer 30, and the third sample analyzer 3001 in sequence by the sample rack transport device.

Similar to the embodiment shown in FIG. 1, in the sample analysis system shown in FIG. 2, a sample sorting device 100 is arranged between the first sample analyzer 20 and the second sample analyzer 30. The sample sorting device 100 is as shown in the above embodiments and will not be described in detail herein.

In an embodiment of the disclosure, the first sample analyzer 20 may be a hematology analyzer, the second sample analyzer 30 may be a C-reactive protein analyzer, the third sample analyzer 3001 may be a slide staining and smearing machine or a glycosylated hemoglobin analyzer, and the sample sorting device 100 is positioned between the blood analyzer and the C-reactive protein analyzer. Alternatively, the first sample analyzer 20 may be a C-reactive protein analyzer, the second sample analyzer 30 may be a slide staining and smearing machine, and the third sample analyzer 3001 may be a glycosylated hemoglobin analyzer.

In this embodiment, the sample sorting device 100 arranged between the first sample analyzer 20 and the second sample analyzer 30 is configured to sort sample containers in the sample rack 40 conveyed from the transport track 110 onto the connecting track 120, and there may be a variety of sorting strategies.

A sorting strategy may be: placing sample containers that only need to be conveyed to the second sample analyzer 30 in one and the same sample rack, and placing sample containers that only need to be conveyed to the third sample analyzer 30 in one and the same sample rack. For example, a total of thirty sample containers that have been tested by the first sample analyzer are placed respectively in three sample racks, among which ten sample containers do not need to be further analyzed, ten sample containers need to be conveyed to the second sample analyzer 30, and ten sample containers need to be conveyed to the third sample analyzer 3001. Without sorting, the three sample racks with sample containers need to be passed through the second sample analyzer 30 and the third sample analyzer 3001 in sequence, and finally be conveyed to the unloading platform. According to the disclosure, however, the sample sorting device 100 sorts the above thirty sample containers, places the sample containers to be conveyed to the second sample analyzer in a sample rack C1 and placing the sample containers to be conveyed to the third sample analyzer in a sample rack C2. The sample rack C1 is directly conveyed to the second sample analyzer, and the sample rack C2 is directly conveyed to the third sample analyzer. By comparison, it can be seen that after sample sorting, the waiting time of sample racks on the flow line can be reduced, and the utilization rate of the sample analyzers can be improved, thus improving the efficiency of the sample analysis system.

Another sorting strategy according to an embodiment of the disclosure may alternatively be: placing sample containers that need to be conveyed to both the second sample analyzer 30 and the third sample analyzer 3001 in one and the same sample rack, placing sample containers that only need to be conveyed to the second sample analyzer 30 in one and the same sample rack, and placing sample containers that only need to be conveyed to the third sample analyzer 3001 in one and the same sample rack.

Another sorting strategy according to an embodiment of the disclosure may be: placing sample containers that only need to be conveyed to the third sample analyzer 3001 in one and the same sample rack, while keeping other sample containers remain in the original sample racks and conveying them to the transport track via the connecting track.

It should be understood that the disclosure may set the sorting strategy according to actual needs, and is not limited to the above sorting strategies.

In an embodiment of the disclosure, the second sample analyzer 30 and the third sample analyzer 3001 share one sample sorting device 100, which can save the occupied space of the flow line. In this case, the sorting platform of the sample sorting device 100 may set priorities. For example, when the second sample analyzer 30 is a slide staining and smearing machine and the third sample analyzer 3001 is a glycosylated hemoglobin analyzer, since the requirement on the measurement time of samples to be tested for glycosylated hemoglobin is low, the samples to be tested for glycosylated hemoglobin may be placed in a sample rack on the rear side of the sorting platform, while samples to be smeared are placed in a sample rack on the front side of the sorting platform. When there are not enough sample containers that need to be tested for glycosylated hemoglobin, only the sample rack with samples to be smeared is sent out of the sorting platform to the slide staining and smearing machine for smearing and staining. When there are enough samples to be tested for glycosylated hemoglobin, the sample rack with the samples to be tested for glycosylated hemoglobin and the sample racks in front thereof are sent out together, to the unloading platform if the sample rack is empty, to the slide staining and smearing machine if the sample rack is a sample rack to be smeared, and to the glycosylated hemoglobin analyzer if the sample rack is a sample rack to be tested for glycosylated hemoglobin.

For other features of the sample sorting system according to the embodiment shown in FIG. 2, reference may be made to the embodiment described with reference to FIG. 1, and they will not be described in detail herein.

Figure 3:
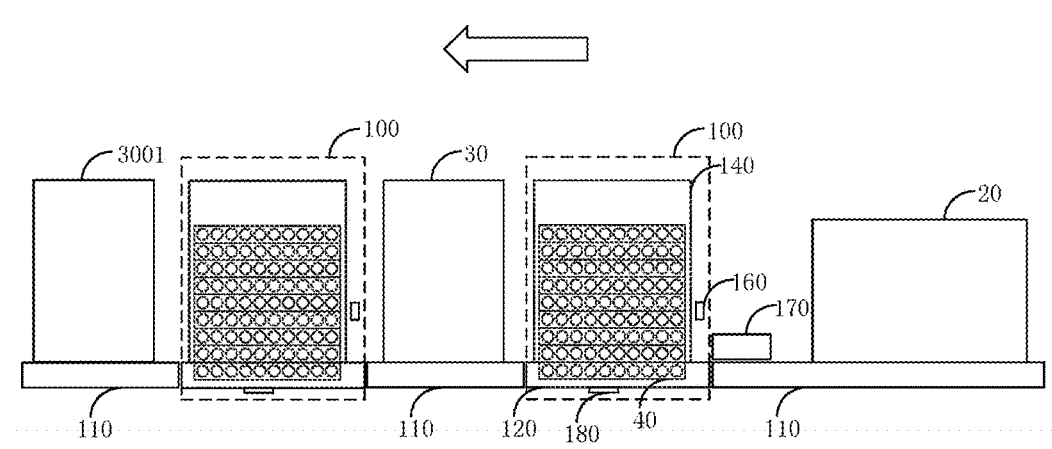

FIG. 3 is a schematic structure diagram of a sample analysis system according to a third embodiment of the disclosure. Different from the sample analyzer system shown in FIG. 2, in addition to the first sample analyzer 20, the second sample analyzer 30, the sample sorting device 100 arranged between the first sample analyzer 20 and the second sample analyzer 30, and the third sample analyzer 3001, this embodiment further comprises a sample sorting device 100 arranged between the second sample analyzer 30 and the third sample analyzer 3001.

The sample sorting device 100 arranged between the first sample analyzer 20 and the second sample analyzer 30 and the sample sorting device 100 arranged between the second sample analyzer 30 and the third sample analyzer 3001 are as shown in the above embodiments, and will not be described in detail herein.

In this embodiment, the two sample sorting devices 100 can sort sample containers in the sample rack 40 conveyed by the transport track 110 to the corresponding connecting track 120, and there are a variety of sorting strategies.

A sorting strategy may be: placing sample containers to be conveyed to the second sample analyzer 30 in one and the same sample rack by the sample sorting device 100 arranged between the first sample analyzer 20 and the second sample analyzer 30, while keeping other sample containers remain in the original sample racks and conveying them to the transport track via the corresponding connection track; and placing sample containers to be conveyed to the third sample analyzer 3001 in one and the same sample rack by the sample sorting device 100 arranged between the second sample analyzer 30 and the third sample analyzer 3001, while keeping other sample containers remain in the original sample racks and conveying them to the transport track via the corresponding connection track.

In the above embodiments of the disclosure, a sample sorting device 100 is provided respectively upstream of and downstream of the second sample analyzer 30. As the transport track 110 in an embodiment of the disclosure may convey sample racks in two directions, it is possible to selectively collect and sort sample containers conveyed to the second sample analyzer 30 in the sample sorting device 100 arranged upstream or downstream of the second sample analyzer 30, and then supply a sample rack 40 with sample containers to be tested stored therein to the second sample analyzer 30 as required.

It should be understood that the disclosure may set the sorting strategy according to actual needs, and is not limited to the above sorting strategies.

For other features of the sample sorting system according to the embodiment shown in FIG. 3, reference may be made to the embodiments described with reference to FIGS. 1 and 2, and they will not be described in detail herein.

Figure 4:
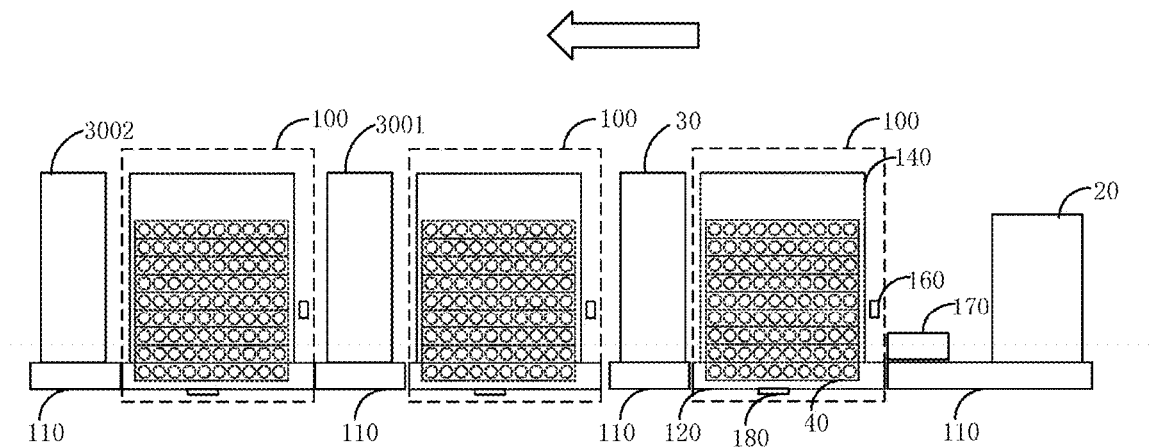

FIG. 4 is a schematic structure diagram of a sample analysis system according to a fourth embodiment of the disclosure. Different from the sample analyzer system shown in FIG. 1, in addition to the first sample analyzer 20, the second sample analyzer 30 and the sample sorting device 100 arranged between the first sample analyzer 20 and the second sample analyzer 30, this embodiment further comprises a third sample analyzer 3001, a fourth sample analyzer 3002, a sample sorting device 100 arranged between the second sample analyzer 30 and the third sample analyzer 3001, and a sample sorting device 100 arranged between the third sample analyzer 3001 and the fourth sample analyzer 3002. The first sample analyzer 20, the second sample analyzer 30, the third sample analyzer 3001, and the fourth sample analyzer 3002 are sequentially arranged along the first conveying direction of the transport track 110. The sample rack 40 may be conveyed by the sample rack transport device through the first sample analyzer 20, the second sample analyzer 30, the third sample analyzer 3001, and the fourth sample analyzer 3002 sequentially.

Each of the sample sorting devices 100 is as shown in the above embodiments and will not be described in detail herein.

In an embodiment of the disclosure, the first sample analyzer 20 may be a hematology analyzer, the second sample analyzer 30 may be a C-reactive protein analyzer, the third sample analyzer 3001 may be a slide staining and smearing machine, and the fourth sample analyzer 3002 may be a glycosylated hemoglobin analyzer. The testing time required by blood routine and CRP tests is short, for example, the outpatient and emergency department may require a report within 30 minutes, and only when there is an abnormality found in a sample during blood routine tests, will the sample be conveyed to a slide staining and smearing machine for smear reading. However, since real-time tests are usually not required for glycosylated samples (it is generally acceptable to give a report on the same day), so the glycosylated hemoglobin analyzer is arranged most downstream.

In this embodiment, the three sample sorting devices 100 can sort sample containers in the sample rack 40 conveyed by the transport track 110 to the corresponding connecting track 120, and there are a variety of sorting strategies.

A sorting strategy may be: placing sample containers to be conveyed to the second sample analyzer 30 in one and the same sample rack by the sample sorting device 100 arranged between the first sample analyzer 20 and the second sample analyzer 30, while keeping other sample containers remain in the original sample racks and conveying them to the transport track via the corresponding connection track; placing sample containers to be conveyed to the third sample analyzer 3001 in one and the same sample rack by the sample sorting device 100 arranged between the second sample analyzer 30 and the third sample analyzer 3001, while keeping other sample containers remain in the original sample racks and conveying them to the transport track via the corresponding connection track; and placing sample containers to be conveyed to the fourth sample analyzer 3002 in one and the same sample rack by the sample sorting device 100 arranged between the third sample analyzer 3001 and the fourth sample analyzer 3002, while keeping other sample containers remain in the original sample racks and conveying them to the transport track via the corresponding connection track.

It should be understood that the disclosure may set the sorting strategy according to actual needs, and is not limited to the above sorting strategies.

For other features of the sample sorting system according to the embodiment shown in FIG. 4, reference may be made to the embodiments described with reference to FIGS. 1-3, and they will not be described in detail herein.

Figure 5:
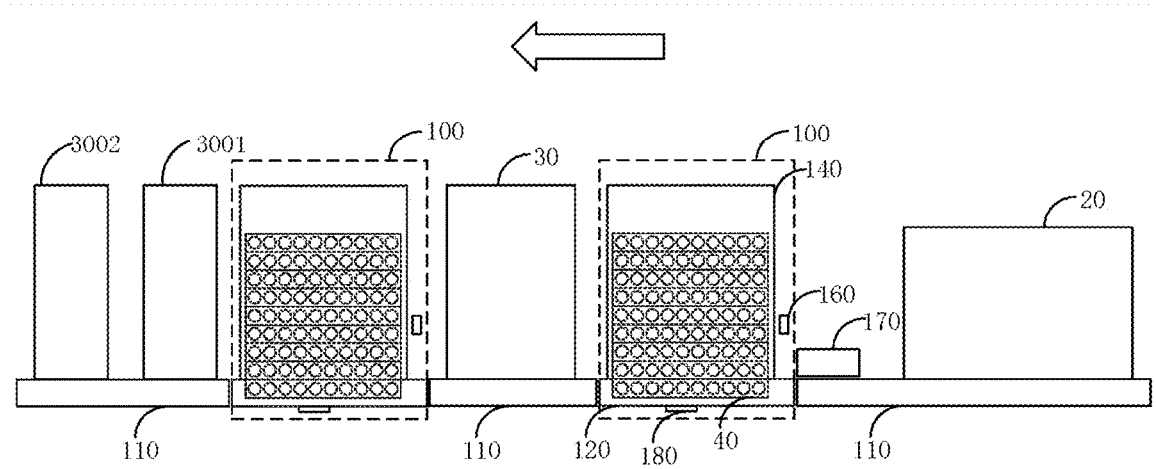

FIG. 5 is a schematic structure diagram of a sample analysis system according to a fifth embodiment of the disclosure. Different from the sample analyzer system shown in FIG. 1, in addition to the first sample analyzer 20, the second sample analyzer 30, and the sample sorting device 100 arranged between the first sample analyzer 20 and the second sample analyzer 30, this embodiment further comprises a third sample analyzer 3001, a fourth sample analyzer 3002, and a sample sorting device 100 arranged between the second sample analyzer 30 and the third sample analyzer 3001. The first sample analyzer 20, the second sample analyzer 30, the third sample analyzer 3001, and the fourth sample analyzer 3002 are sequentially arranged along the first conveying direction of the transport track 110. The sample rack 40 is conveyed by the sample rack transport device through the first sample analyzer 20, the second sample analyzer 30, the third sample analyzer 3001, and the fourth sample analyzer 3002 sequentially.

Each of the sample sorting devices 100 is as shown in the above embodiments and will not be described in detail herein.

In this embodiment, the two sample sorting devices 100 can sort sample containers in the sample rack 40 conveyed by the transport track 110 to the corresponding connecting track 120, and there are a variety of sorting strategies.

A sorting strategy may be: placing sample containers to be conveyed to the second sample analyzer 30 in one and the same sample rack by the sample sorting device 100 arranged between the first sample analyzer 20 and the second sample analyzer 30, while keeping other sample containers remain in the original sample racks and conveying them to the transport track via the corresponding connection track; and placing sample containers to be conveyed to the third sample analyzer 3001 in one and the same sample rack and placing sample containers to be conveyed to the fourth sample analyzer 3002 in one and the same sample rack by the sample sorting device 100 arranged between the second sample analyzer 30 and the third sample analyzer 3001.

Another sorting strategy according to an embodiment of the disclosure may be: placing sample containers to be conveyed to the second sample analyzer 30 in one and the same sample rack, placing sample containers to be conveyed to the third sample analyzer 3001 in one and the same sample rack, and placing sample containers to be conveyed to both the second sample analyzer 20 and the third sample analyzer 3001 in one and the same sample rack by the sample sorting device 100 arranged between the first sample analyzer 20 and the second sample analyzer 30; and placing sample containers to be conveyed to the fourth sample analyzer 3002 in one and the same sample rack by the sample sorting device 100 arranged between the second sample analyzer 30 and the third sample analyzer 3001.

It should be understood that the disclosure may set the sorting strategy according to actual needs, and is not limited to the above sorting strategies.

For other features of the sample sorting system according to the embodiment shown in FIG. 5, reference may be made to the embodiments described above with reference to FIGS. 1-4, and they will not be described in detail herein.

Figure 6:
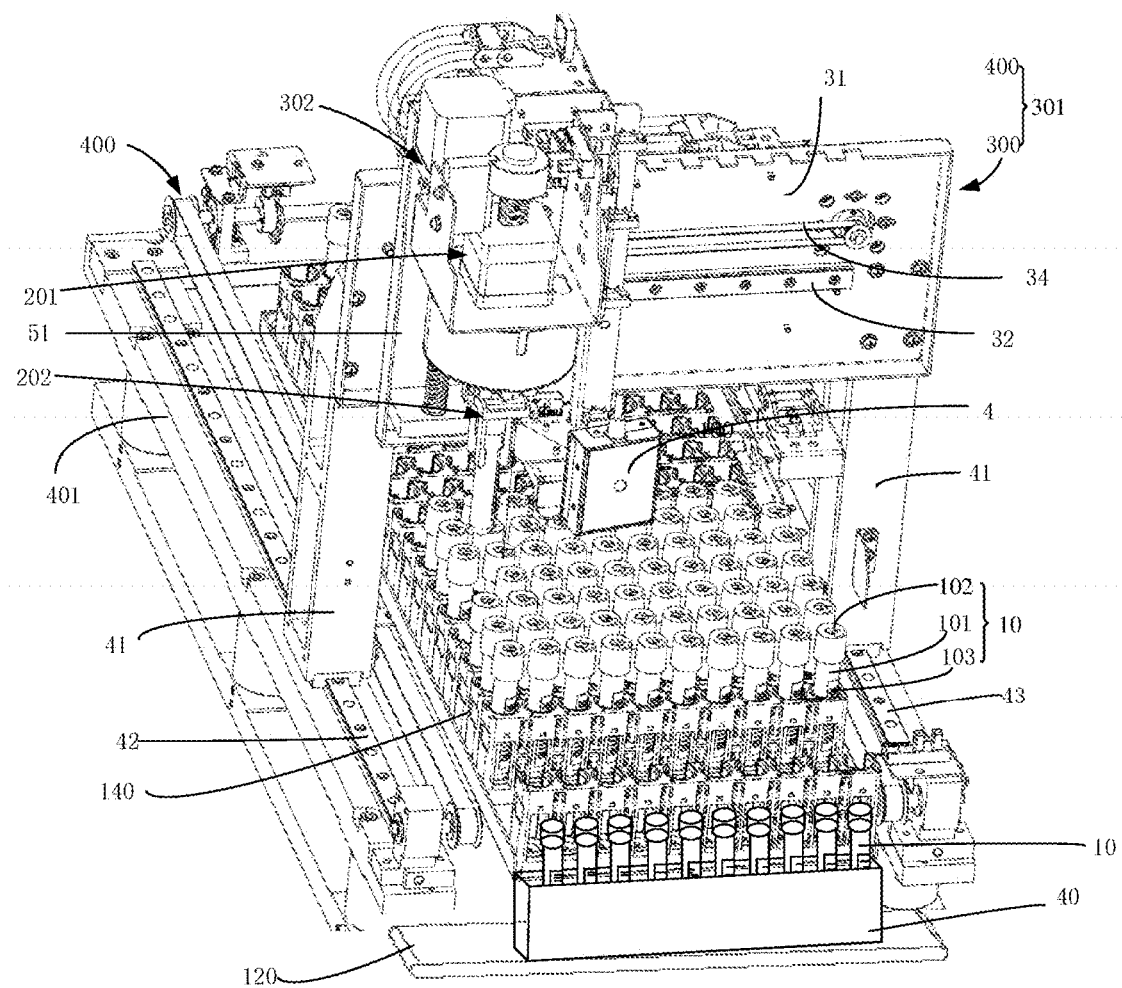
FIG. 6 is a schematic perspective structure diagram of a sample sorting device according to an embodiment of the disclosure in a perspective view.

FIG. 6 is a schematic perspective structure diagram of a sample sorting device according to an embodiment of the disclosure. As shown in FIG. 6, in this embodiment of the disclosure, the sample transfer mechanism of the sample sorting device 100 mainly comprises a gripping mechanism 201, a rotary drive mechanism 202, a horizontal drive mechanism 301, a vertical drive mechanism 302, and a first support 51. Here, the sample rack on the sorting platform 140 is configured to receive the sample container 10 to be sorted, which is gripped by the sample transfer mechanism from the sample rack 40 on the connecting track 120, and the sample container to be sorted 10 is provided with a sample barcode 103. The gripping mechanism 201 is configured to grip the sample container 10 to be sorted from the sample rack 40 on the connecting track 120. The rotary drive mechanism 202 is connected to the gripping mechanism 201 and configured to drive the gripping mechanism 201 to rotate about its vertical axis, especially drive the gripping mechanism 201 together with the gripped sample container 10 to be sorted to rotate about its vertical axis. The vertical drive mechanism 302 is connected to the gripping mechanism 201 and is configured to drive the gripping mechanism 201 together with the sample container to be sorted gripped thereby to move in a vertical direction Z. Here, the first identifier 4 is configured as a scanner. The first identifier 4 is arranged adjacent to the gripping mechanism 201 and configured to scan and identify the sample barcode 103 of the sample container 10 to be sorted, which is gripped by the gripping mechanism 201, in a scanning area thereof.

The sample container 10 comprises a test tube body 101 and a test tube cap 102 mating with each other. The sample barcode 103 is provided on an outer side wall of the test tube body 101. The test tube body 101 is configured to accommodate a sample. The barcode information stored in the sample barcode 103 comprises the test type of the sample to be tested. The test type comprises, for example, but not limited to, a routine blood test, a C-reactive protein test, a glycosylated hemoglobin test, etc. In some embodiments, the outer diameter of the test tube cap 102 is greater than the outer diameter of the test tube body 101. The outer diameter and the shape of the test tube cap 102 may be flexibly set such that the gripping mechanism can grip the sample container 10 more reliably.

The first support 51 is configured to mount the gripping mechanism 201, the rotary drive mechanism 202, the vertical drive mechanism 302, and the first identifier 4. The horizontal drive mechanism 301 is connected to the first support 51 and configured to drive the first support 51 together with the gripping mechanism 201, the rotary drive mechanism 202, the vertical drive mechanism 302 and the first identifier 4 mounted on the first support 51 to move in a horizontal direction X/Y. A controller (not shown in FIG. 6) is configured to electrically connect with the gripping mechanism 201, the rotary drive mechanism 202, the horizontal drive mechanism 301, the vertical drive mechanism 302, and the first identifier 4 to control the actions of the gripping mechanism 201, the rotary drive mechanism 202, the horizontal drive mechanism 301, the vertical drive mechanism 302, and the first identifier 4. The controller is further configured to sort the sample container 10 to be sorted according to the barcode information of the sample barcode 103 of the sample container 10 that has been identified by the first identifier 4.

The horizontal drive mechanism 301 can drive the first support 51 together with the gripping mechanism 201, the rotary drive mechanism 202, the vertical drive mechanism 302, and the first identifier 4 mounted on the first support 51 to move horizontally, that is, the first identifier 4 can move horizontally in synchronization with the gripping mechanism 201. Therefore, the gripping mechanism 201 does not have to move the sample container 10 to be sorted horizontally to a scanner fixedly arranged at a specified position for every scanning operation. Instead, once the gripping mechanism 201 removes the sample container 10 to be sorted away from the sample rack 40 in the vertical direction Z, the first identifier 4 arranged beside the gripping mechanism 201 can immediately perform the scanning operation on the sample container to be sorted, thus shortening the moving distance of the sample container 10 to be sorted, thereby improving the efficiency for sorting the sample container 10 to be sorted and facilitating the operation.

Preferably, as shown in FIG. 6, the first identifier 4 is fixedly mounted to the first support 51, and the gripping mechanism 201 is mounted to the first support 51 in a way of being capable of moving along the vertical direction Z, and the first identifier 4 and the gripping mechanism 201 are positioned on the same side of the first support 51. More preferably, the scanning area of the first identifier 4 is set in the path along which the gripping mechanism 201 moves in the vertical direction Z.

Figure 7:
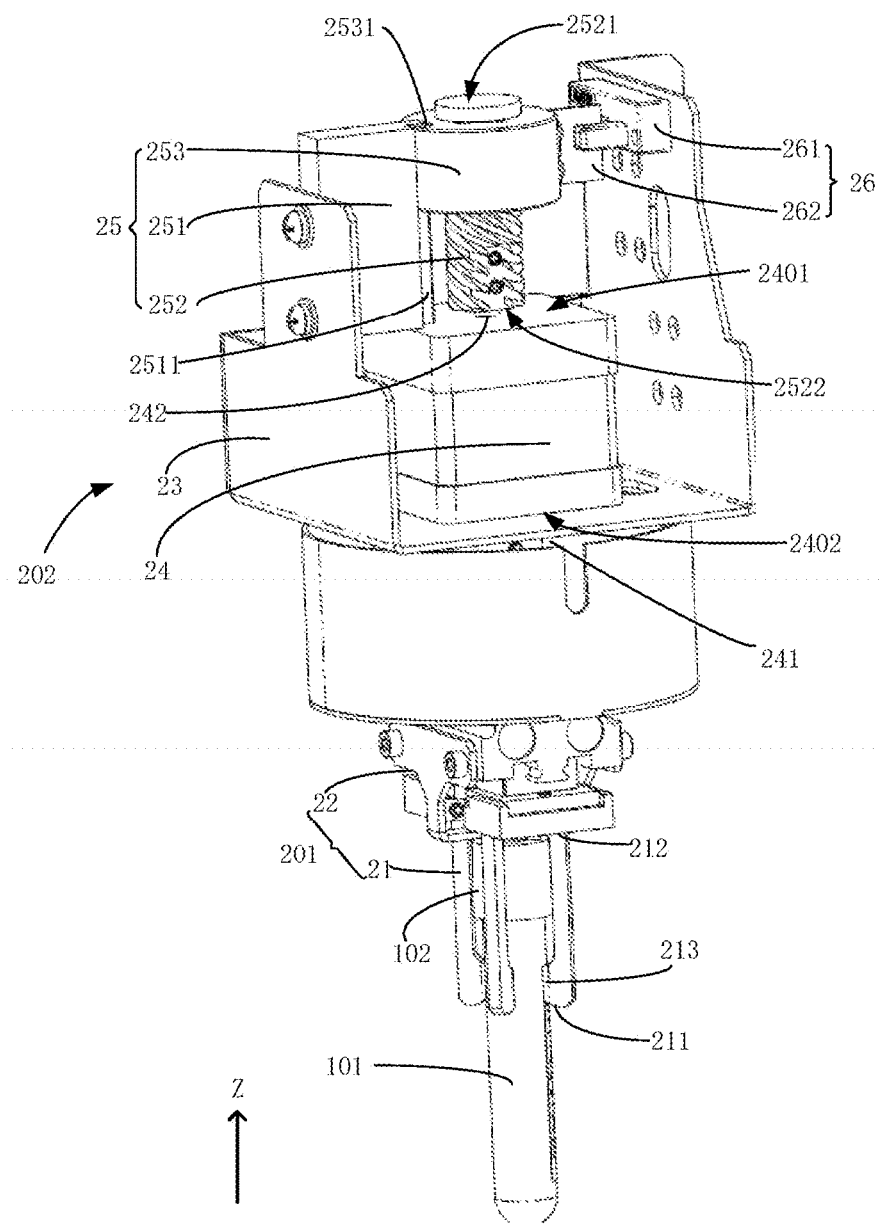
FIG. 7 is a schematic perspective structure diagram of a rotary drive mechanism and a gripping mechanism of the sample sorting device in FIG. 6.

As shown in FIG. 7, the gripping mechanism 201 may be constructed as a pneumatic gripping mechanism 22, wherein the pneumatic gripping mechanism 22 comprises a pneumatic gripper and a pneumatic cylinder connected to each other. The pneumatic cylinder is configured to drive the pneumatic gripper to clamp or release the sample container 10 to be sorted.

It can be understood that, the gripping mechanism 201 may also be configured as a mechanical gripping mechanism, an electric gripping mechanism or a hydraulic gripping mechanism, but the disclosure is not limited thereto.

In some embodiments, at least one jaw 21 may be fixed to the first pneumatic gripper 223 and the second pneumatic gripper 224, respectively, and the pneumatic cylinder 222 is configured to drive the first pneumatic gripper 223 and the second pneumatic gripper 224 to approach or move away from each other, so that the corresponding jaws 21 fixed on the first pneumatic gripper 223 and the second pneumatic gripper 224 approach or move away from each other so as to clamp or release the sample container 10 to be sorted. Each jaw 21 comprises a free end 211 and a connecting end 212 opposite each other. In order to enhance the reliability of gripping the test tube body 101 by the jaws 21, the free end 211 of each jaw 21 is provided with a chuck 213 for clamping the test tube body 101 tightly, so that the chucks 213 of the jaws 21 can grip the test tube body 101. In some embodiments, each jaw 21 is substantially L-shaped to prevent the jaw 21 from interfering with the test tube cap 102.

As shown in FIG. 7, in some embodiments, the rotary drive mechanism 202 may comprise a first motor 24 having a first rotating shaft 241 extending vertically, and the gripping mechanism 201 is fixed to the first rotating shaft 241. The first motor 24 is configured to drive the gripping mechanism 201 to rotate around the first rotating shaft 241 so that the sample bar code 103 of the sample container 10 to be sorted, which is gripped by the gripping mechanism 201, can be reliably scanned and identified by the first identifier 4. Here, the axial direction of the first rotating shaft 241 is parallel to the vertical direction Z.

In addition, the rotary drive mechanism 202 may further comprise a mounting frame 23 for fixing the first motor 24. The rotary drive mechanism 202 is fixed to the first support 51 via the mounting frame 23. The first motor 24 is fixed to the bottom of the mounting frame 23.

In some embodiments, the rotary drive mechanism 202 may further comprise a stopper 25 for limiting the rotation stroke of the motor 24. Specifically, in one embodiment, as shown in FIG. 7, the motor 241 has a second rotating shaft 242 extending vertically and opposite the first rotating shaft 241. The stopper 25 comprises an anti-rotation block 251, a screw rod 252, and a nut 253. The anti-rotation block 251 is fixed to the mounting frame 23. The screw rod 252 is fixed to the second rotating shaft 242. The axial direction of the screw rod 252 is collinear with the axial direction of the second rotating shaft 242.

The first motor 24 comprises a first end face 2401 and a second end face 2402 opposite each other. The screw rod 252 comprises an upper end face 2521 and a lower end face 2522 opposite each other.

The nut 253 is sleeved on the screw rod 252 and engaged with the anti-rotation block 251 in a way of being capable of moving along the screw rod 252. The anti-rotation block 251 is configured to restrict the nut 253 to rotating around the screw rod 252 under the drive of the first motor 24, so that the nut can move between the upper end face 2401 of the first motor 24 and the upper end face 2521 of the screw rod 252 under the drive of the first motor 24.

Specifically, as shown in FIG. 7, one side of the anti-rotation block 251 close to the nut 253 is provided with a protrusion 2511, and the nut 253 is provided with a groove 2531 mating with the protrusion 2511 to restrict the nut 253 to rotating about the vertical direction Z.

When the first motor 24 rotates, the nut 253 moves in the vertical direction Z between the first end face 2401 of the motor 24 and the upper end face 2521 of the screw rod 252. When the nut 253 moves into contact with the first end face 2401 of the first motor 24 or the upper end face 2521 of the screw rod 252, the nut 253 stops moving and the first motor 24 is locked.

In some embodiments, the rotary drive mechanism 202 further comprises a positioning member 26. The positioning member 26 is configured to determine an initial position of the nut 253, thereby determining an initial rotation angle of the gripping mechanism 201 about its vertical axis. When the gripping mechanism 201 grips a test tube from the sample rack 40 or places a test tube into the sample rack 40, the gripping mechanism may affect the nearby test tubes due to improper angular position of rotation around its vertical axis, it is thus preferably to initialize the rotational angular position of the gripping mechanism 201 before moving vertically to a position above the sample rack 40.

Specifically, the positioning member 26 comprises an optocoupler 261 electrically connected to a controller and an optocoupler blocking piece 262 cooperating with the optocoupler 261. The optocoupler 261 is arranged opposite to the initial position of the nut 253, and the optocoupler blocking piece 262 is fixed to the nut 253 and moves synchronously with the nut 253. The controller is configured to control the action of the rotary drive mechanism 202 according to electrical signals of the optocoupler 261. Here, the optocoupler 261 is fixed to the mounting frame 23. In this embodiment, the initial position may refer to a preset position where the nut 253 is close to the upper end face 2521 of the screw rod 252.

As shown in FIG. 6, in some embodiments, the horizontal drive mechanism 301 comprises a first horizontal drive mechanism 300 and a second support 31. The first horizontal drive mechanism 300 is electrically connected to a controller and is configured to drive the first support 51 together with the gripping mechanism 201, the rotary drive mechanism 202, the vertical drive mechanism 302, and the first identifier 4 provided thereon to move horizontally along a first direction X perpendicular to the vertical direction Z under the control of the controller. The second support 31 is configured for mounting the first support 51 and the first horizontal drive mechanism 300.

In some embodiments, the first horizontal drive mechanism 300 comprises a first linear guide rail 32, a first slider 33, and a first horizontal driving motor 34. The first linear guide rail 32 is fixed to the second support 31 and extends in the first direction X. The first slider 33 is slidably arranged on the first linear guide rail 32 and fixedly connected to the first support 51. The first horizontal driving motor 34 is fixed to the second support 31 and connected to the first slider 33 to drive the first slider 33 to move the first support 51 along the first linear guide rail 32, thereby realizing the movement of the gripping mechanism 201 and the first identifier 4 in the first direction X.

As shown in FIG. 6, in some embodiments, the horizontal drive mechanism 301 further comprises a second horizontal drive mechanism 400 and a third support 41. The second horizontal drive mechanism 400 is electrically connected to the controller and is configured to drive the second support 31 together with the first support 51 mounted thereon to move horizontally in a second direction Y perpendicular to both the vertical direction Z and the first direction X under the control of the controller. The third support 41 is configured for mounting the second support 31 and can move horizontally in the second direction Y.

Specifically, the second horizontal drive mechanism 400 comprises second linear guide rails 42 and 43 and a second horizontal driving motor 44. One end of the third support 41 is fixedly connected to the second support 31 and the other end thereof is slidably connected to the second linear guide rails 42 and 43. The second horizontal driving motor 44 is configured to drive the third support 41 to move horizontally in the second direction Y along the second linear guide rails 42 and 43.

Figure 8:
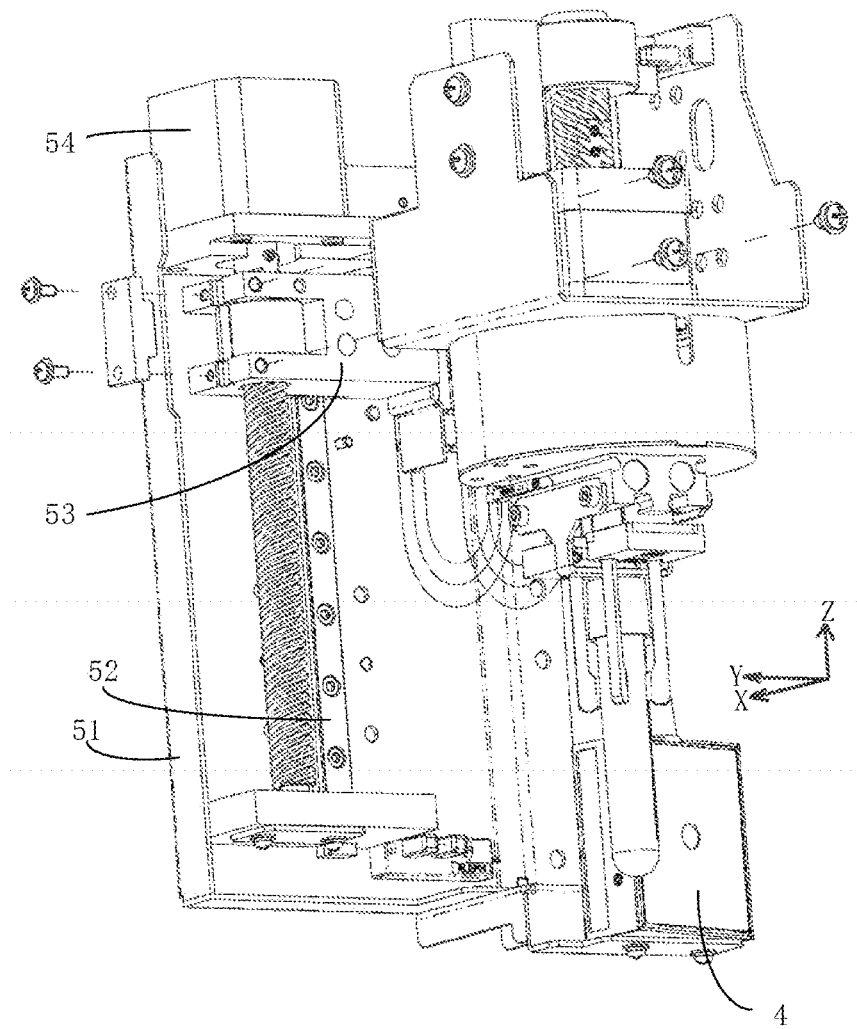
FIG. 8 is a schematic perspective structure diagram of a vertical drive mechanism of the sample sorting device in FIG. 6.

As shown in FIG. 8, the vertical drive mechanism 302 comprises a third linear guide rail 52 arranged on the first support 51, a second slider 53 slidably connected to the third linear guide rail 52, and a vertical driving motor 54 driving the second slider 53 to slide along the third linear guide rail 52. The extending direction of the third linear guide rail 52 is parallel to the vertical direction Z. The vertical drive mechanism 302 is connected to the mounting frame 23 of the rotary drive mechanism 202 through the second slider 53, so that the vertical driving motor 54 can drive the second slider 53 to drive the rotary drive mechanism 202 and the gripping mechanism 201 to move along the third linear guide rail 52 in the vertical direction.

It can be understood that there are various ways to realize the guidance and transmission of the gripping mechanism 201 in the vertical direction Z and the horizontal directions X and Y, which is not specifically limited in the disclosure.

According to the disclosure, the first identifier 4 can only move horizontally along with the first support 51, that is, the first identifier 4 can move in the first horizontal direction X and the second horizontal direction Y with the first support 51, but the first identifier 4 will not move in the vertical direction Z along with the rotary drive mechanism 202 and the gripping mechanism 201, thus shortening the moving distance of the sample container 10 to be sorted, further improving the sorting efficiency of the sample container 10 to be sorted and facilitating the operation.

The detailed structure of the sample sorting device 100 is disclosed in the Chinese invention application filed on the same day by the applicant, the disclosure of which is herein incorporated by reference.

Figure 9:
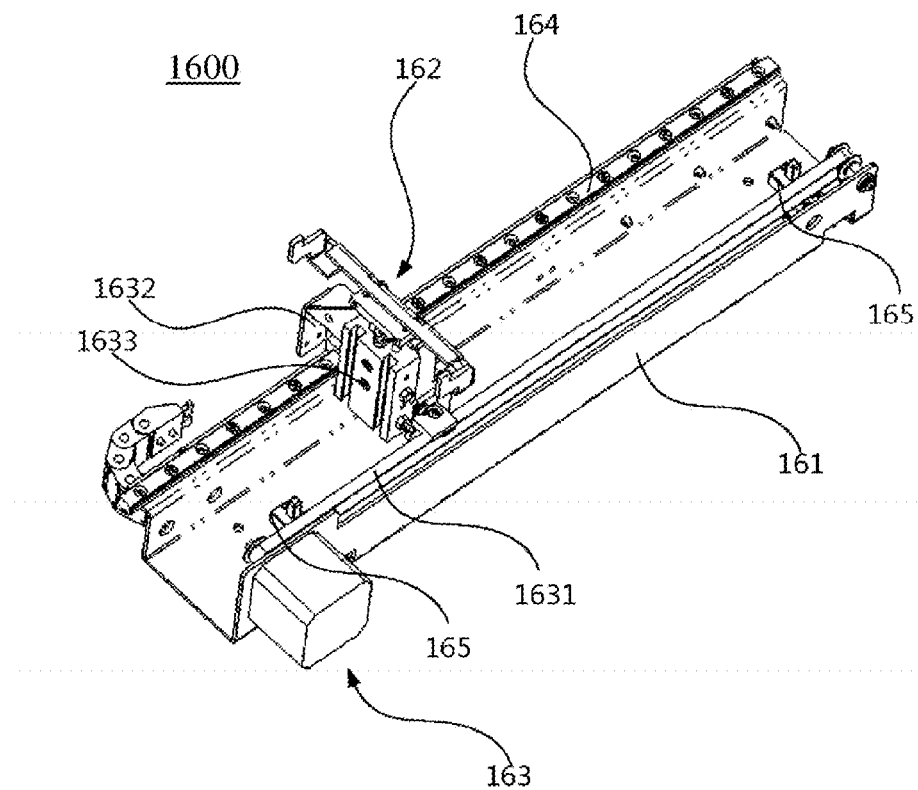
FIG. 9 is a schematic perspective structure diagram of a loading mechanism according to an embodiment of the disclosure.

FIG. 9 is a schematic perspective structure diagram of a loading mechanism according to an embodiment of the disclosure. As shown in FIG. 9, the sample sorting device 100 in this embodiment further comprises a loading mechanism 1600 for pushing the sample rack 40 on the sorting platform 140 towards or away from the connecting track 120. In an embodiment of the disclosure, the loading mechanism 1600 is arranged below the sorting platform 140.

Specifically, the loading mechanism 1600 comprises: a support 161 configured to support the loading mechanism 1600; a pusher 162 configured to drive the sample rack 40 stored on the sorting platform 140 to slide towards or away from the connecting track 120; and a pusher driving device 163 arranged on the support 161, and configured to drive the pusher 162 to perform the above-mentioned sliding process, that is, drive the pusher 162 to drive the sample rack 40 stored on the sorting platform 140 to slide towards or away from the connecting track 120.

The pusher driving device 163 of the loading mechanism 1600 comprises a horizontal pushing assembly 1631, a pusher mounting base 1632, and a lifting assembly 1633. The horizontal pushing assembly 1631 is arranged on the support 161 and is capable of moving horizontally relative to the support 161. The pusher mounting base 1632 is linked to the horizontal pushing assembly 1631. The horizontal pushing assembly 1631 is capable of driving the pusher mounting base 1632 to move horizontally towards or away from the connecting track 120. The lifting assembly 1633 is arranged on the pusher mounting base 1632. Here, the lifting assembly 1633 is configured to drive the pusher 162 to approach the sample rack 40, to enable the pusher 162 to abut against and be linked to the sample rack 40. The horizontal pushing assembly 1631 is capable of driving the pusher mounting base 1632 to move horizontally, thereby causing the pusher 162 to slide towards or away from the connecting track 120.

In a preferred implementation, the horizontal pushing assembly 1631 may be a driving structure using a motor and a synchronous belt. The motor is used to drive the synchronous belt to rotate, so as to drive the pusher mounting base 1632 to move horizontally. Certainly, the horizontal pushing assembly 1631 may be alternatively a linear motor, the primary part of which drives the pusher mounting base 1632 to perform a horizontal linear movement. To ensure stable operation of the pusher mounting base 1632, a linear guide rail 164 may further be mounted on the support 161. The pusher mounting base 1632 is slidably mounted on the linear guide rail 164. The lifting assembly 1633 may be a lifting cylinder. A cylinder body of the lifting cylinder is fastened to the pusher mounting base 1632. The pusher 162 is fixedly connected to a piston rod of the lifting cylinder. The piston rod of the lifting cylinder is controlled to drive the pusher 162 to ascend or descend.

In addition, the sorting platform 140 comprises a panel (not shown) for holding the sample rack 40, and the panel is provided with an elongated hole extending from the sorting platform 140 to the connecting track 120. The lifting assembly 1633 drives the pusher 162 to ascend such that the pusher 162 at least partially penetrates through the elongated hole, and cooperates with and is linked to a bottom of the sample rack 40.

Further, to determine the moving position of the pusher 162, two ends of the support 161, which are near the connecting track 120 and the inner side of the sorting platform 140 respectively, are each provided with a position sensor 165. The position sensors 165 can cooperate with the pusher mounting base 1632 or the pusher 162 to enable a system controller to acquire the moving position of the pusher 162. The position sensors 165 are preferably optocouplers. Optocoupler pieces are arranged on the pusher mounting base 1632. When the pusher mounting base 1632 moves near the connecting track 120 or the transport track 110, the optocoupler piece and the optocoupler cooperate with each other to enable the optocoupler to send a sensing signal, to enable the system controller to determine the position of the pusher 162.

The pusher 162 is arranged on the lifting assembly 1633, and the lifting assembly 1633 drives the pusher 162 to ascend, such that the pusher 162 at least partially penetrates through an elongated hole formed along the Y direction in the sorting platform 140 and cooperates with the bottom of the sample rack 40.

The structure of only one embodiment of the loading mechanism 1600 in the sample analysis system in the disclosure is described above. It can be understood that the loading mechanism 1600 may be a robotic hand structure.

Figure 10:
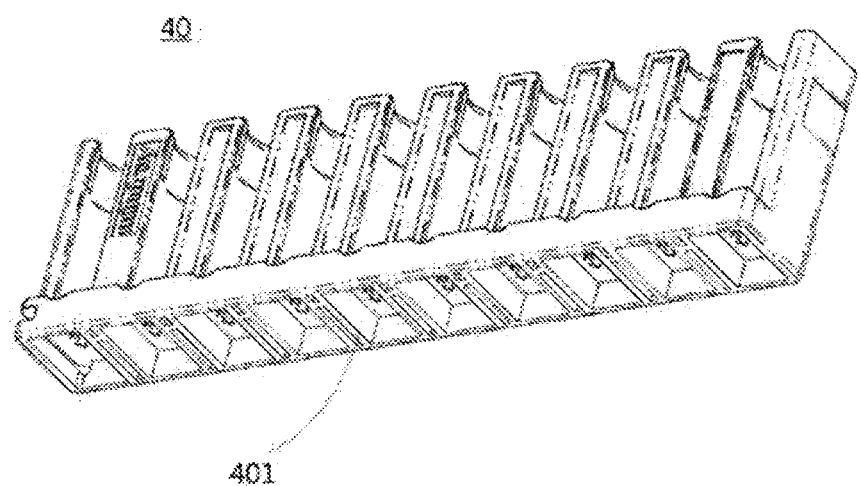
FIG. 10 is a schematic structure diagram of a sample rack according to an embodiment of the disclosure.

FIG. 10 is a schematic structure diagram of a sample rack according to an embodiment of the disclosure. In this embodiment, the sample rack 40 has a structure capable of cooperating with the pusher 162. As shown in FIG. 10, the bottom of the sample rack 40 is provided with bottom grooves 401 spaced apart from each other. The pusher 162, when protruding upward from the elongated hole 142 in the sorting platform 140, may be inserted into the bottom grooves 401 in the bottom of the sample rack 40 so as to drive the sample rack 40 to move synchronously. In addition, in an implementation of the disclosure, two guide side walls are arranged on two sides of the panel of the sorting platform 140, respectively. The two guide side walls form a placement opening that opens upward. The placement opening can enable a sample rack to be placed on the panel from above and the guide side walls can limit the sample rack at two ends. In addition, because the height of the pusher 162 is set to enable the pusher to adequately abut against the bottom of the sample rack 40, it can be ensured that the sample rack is not likely to fall during movement. Certainly, the pusher 162 may alternatively push the sample rack 40 from the front and rear sides of the bottom of the sample rack 40 to slide on the sorting platform 140.

In addition, the disclosure also provides a sample analysis method, which is applied to a sample analysis system, especially to the sample analysis system shown in FIGS. 1-10.

In the embodiments of the disclosure, functional modules with the same reference number have the same or similar structures or functions and will not be repeated here.

In an embodiment of the disclosure, the sample analysis system comprises a first sample analyzer 20, a second sample analyzer 30, a sample rack transport device, and a sample sorting device 100. The sample rack transport device is provided with a transport track 110 and is configured to convey a sample rack 40 with at least one sample container placed therein to the first sample analyzer 20 and/or the second sample analyzer 30 for testing. The first sample analyzer 20 and the second sample analyzer 30 are sequentially arranged along a first conveying direction of the transport track 110. The sample sorting device 100 is arranged between the first sample analyzer 20 and the second sample analyzer 30.

Figure 11:
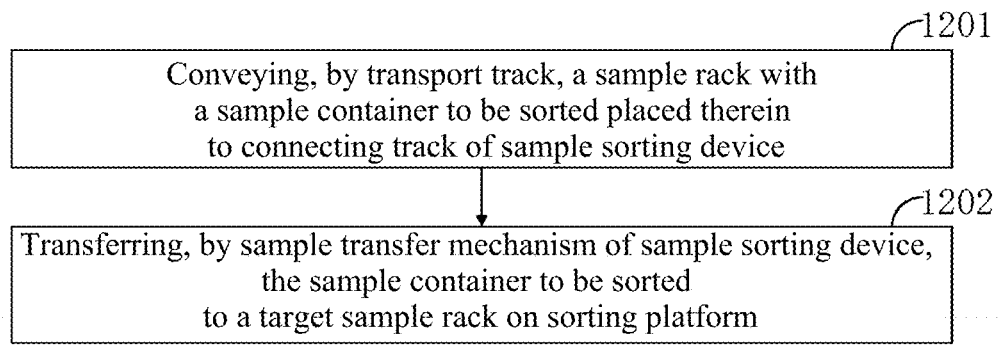
FIGS. 11 and 12 are flowcharts of sample analysis methods according to embodiments of the disclosure.

As shown in FIG. 11, the sample analysis method according to a first embodiment of the disclosure comprises:

step 1201: conveying, by the transport track 110, a sample rack with a sample container to be sorted placed therein to a connecting track 120 of the sample sorting device 100; and step 1202: transferring, by a sample transfer mechanism 160 of the sample sorting device 100, the sample container to be sorted to a target sample rack on a sorting platform 140 of the sample sorting device 100.

The method of the embodiment of the disclosure can reduce detainment time of sample racks in the sample rack transport device and avoid "jams" in the sample analysis system, thus improving the efficiency of the sample analysis system.

In an embodiment of the disclosure, step 1202 may comprise:

moving the sample transfer mechanism 160 to a position above the connecting track 120 to transfer the sample container to be sorted to the target sample rack on the sorting platform 140.

Here, the sample container to be sorted is in particular a sample container which needs to be conveyed to the second sample analyzer 30 for testing.

In other embodiments of the disclosure, the sample analysis system may further comprise a third sample analyzer and/or a fourth sample analyzer, and may further comprise a sample sorting device 100 positioned between the second sample analyzer 30 and the third sample analyzer, or may further comprise a sample sorting device 100 positioned between the third sample analyzer and the fourth sample analyzer. In this case, the sample container to be sorted may be a sample container that need to be conveyed to the third sample analyzer and/or the fourth sample analyzer for testing.

In an embodiment of the disclosure, step 1202 may also comprise:

conveying the sample rack with the sample container to be sorted placed therein from the connecting track 120 to the sorting platform 140;

moving the sample transfer mechanism 160 to a position above the sample rack with the sample container to be sorted placed therein to transfer the sample container to be sorted to the target sample rack on the sorting platform 140; and conveying the sample rack with the sample container to be sorted removed from the sorting platform 140 to the connecting track 120.

In an embodiment of the disclosure, transferring, by the sample transfer mechanism 160, the sample container to be sorted to the target sample rack on the sorting platform 140 may comprise:

gripping, by the sample transfer mechanism 160, the sample container to be sorted;

identifying, by a first identifier 4 of the sample sorting device 100, sample identity information of the sample container to be sorted that is gripped by the sample transfer mechanism 160;

determining the target sample rack corresponding to the sample container to be sorted according to the sample identity information; and transferring, by the sample transfer mechanism 160, the currently gripped sample container to be sorted to the target sample rack, wherein the first identifier 4 moves horizontally in synchronization with the sample transfer mechanism 160.

In the embodiment of the disclosure, the first identifier 4 moves horizontally in synchronization with the sample transfer mechanism 160, so that the identity information of the sample container can be identified in the transfer process, without transferring the sample container to a specific area for identification, thus reducing the time for identifying the identity information and improving the sorting efficiency of sample containers, and then improving the efficiency of the sample analysis system.

Figure 12:
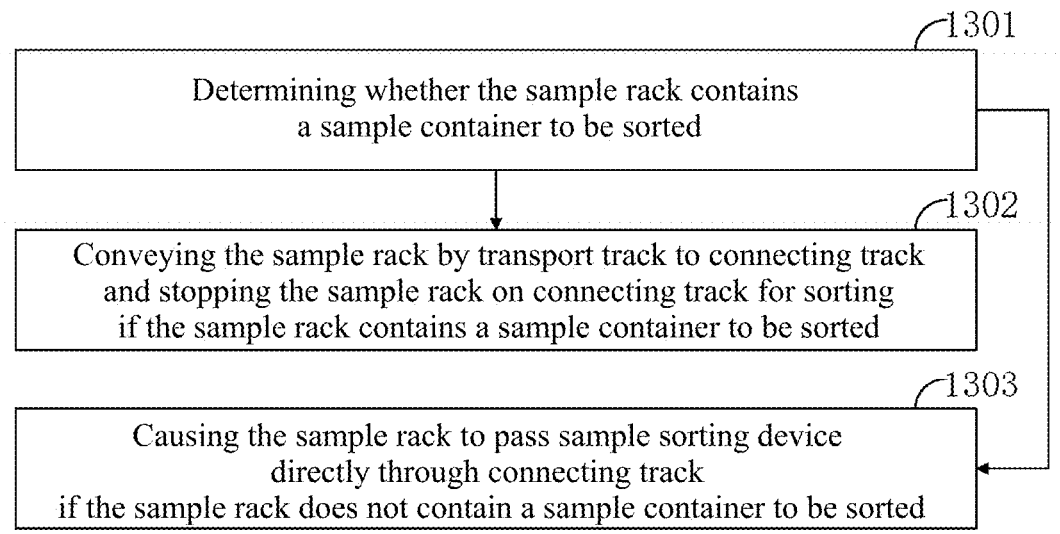

FIG. 12 is a flow chart of the sample analysis method according to a second embodiment of the disclosure. As shown in FIG. 12, different from FIG. 11, before conveying, by the transport track 110, the sample rack with the sample container to be sorted placed therein to the connecting track 120 of the sample sorting device 100, the method further comprises:

step 1301: determining whether the sample rack contains a sample container to be sorted; and step 1302: conveying the sample rack by the transport track to the connecting track 110 and stopping the sample rack on the connecting track 120 for sorting if the sample rack contains a sample container to be sorted; or step 1303: causing the sample rack to pass the sample sorting device 100 directly through the connecting track 120 if the sample rack does not contain a sample container to be sorted.

In an embodiment of the disclosure, step 1301 may comprise:

identifying, by a second identifier 170, sample rack identity information of the sample rack to be conveyed to the connecting track 120, and acquiring sample identity information of the sample container in the sample rack according to the sample rack identity information; and determining whether the sample rack contains a sample container to be sorted according to the sample identity information.

In the embodiment of the disclosure, the second identifier 170 identifies sample rack identity information of the sample rack to be conveyed to the connecting track 120, and it can be determined in advance whether the sample container in the sample rack need to be sorted. If sorting is not required, the sample rack can be conveyed to a next sample analyzer or a next sample sorting device 100 or an unloading platform, which can reduce the workload of the sample sorting system and improve the processing efficiency.

In addition, in an embodiment of the disclosure, the method may further comprise:

step 1401: determining whether a sample rack is required to be conveyed to the second sample analyzer 30 according to a preset rule; and step 1402: pushing, by a loading mechanism 1600, target sample racks on the sorting platform 140 towards the connecting track 120 until the target sample rack closest to the connecting track 120 reaches the connecting track 120, when a sample rack is required to be conveyed to the second sample analyzer 30.

The preset rule may be: it is detected that at least one fully-loaded sample rack is placed on the sorting platform, or a preset time is reached, or it is detected that a user triggers a start button.

In an embodiment of the disclosure, step 1402 may comprise:

pushing, by the loading mechanism 1600, a plurality of target sample racks on the sorting platform 140 towards the connecting track 120 such that the target sample rack, which is closest to the connecting track 120, of the plurality of target sample racks reaches the connecting track 120.

It should be noted that when the loading mechanism 1600 pushes a plurality of target sample racks, because the target sample racks press against each other, there will be pressure between the frontmost sample rack and the side walls or other elements on the connecting track 120, and then friction will be generated, and the connecting track 120 may not smoothly take away the frontmost sample racks, thus affecting the scheduling of the whole sample rack transport device.

Therefore, in an embodiment of the disclosure, step 1402 may comprise:

pushing, by the loading mechanism 1600, a first target sample rack that is farthest from the connecting track 120 among the plurality of target sample racks so as to move the plurality of target sample racks towards the connecting track 120 until a second target sample rack that is closest to the connecting track 120 among the plurality of target sample racks reaches the connecting track 120; and moving the loading mechanism 1600 away from the first target sample rack and to a third target sample rack directly adjacent to the second target sample rack to come into contact with the third target sample rack, so as to separate the second target sample rack from the third target sample rack.

Specifically, the loading mechanism 1600 is moved to a position under the third target sample rack directly adjacent to the second target sample rack and catches the third target sample rack; and the loading mechanism 1600 pushes the third target sample rack to move the third target sample rack and the sample racks that follows thereafter away from the connecting track 120 until the second target sample rack is separated from the third target sample rack.

More specifically, step 1402 may comprise:

abutting against and pushing, by a pusher 162 in the loading mechanism 1600, the first target sample rack that is farthest from the connecting track 120 among the plurality of target sample racks, so as to move the plurality of target sample racks towards the connecting track 120 until the second target sample rack that is closest to the connecting track 120 among the plurality of target sample racks reaches the connecting track 120;

driving the pusher 162 by a lifting assembly 1631 in the loading mechanism 1600 to move downward and away from the first target sample rack;

driving the lifting assembly 1631 by a pusher driving device 163 to move toward the connecting track 120 such that the pusher 162 moves to a position under the third target sample rack directly adjacent to the second target sample rack;

driving the pusher 162 by the lifting assembly 1631 to ascend until the pusher abuts against the third target sample rack; and pushing the third target sample rack by the pusher 162 to move the third target sample rack away from the connecting track 120 until the second target sample rack is separated from the third target sample rack.

Figure 13:
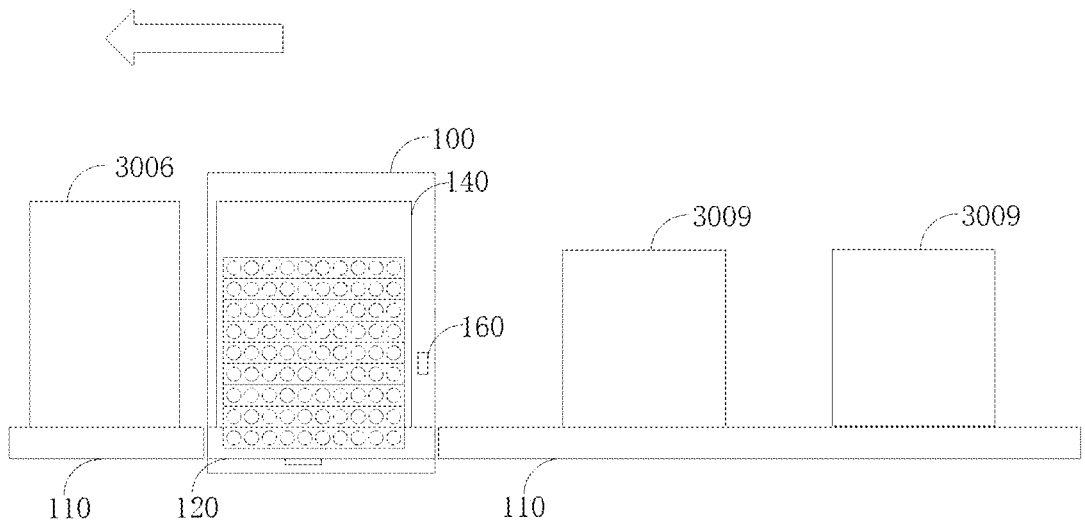
FIGS. 13 and 14 are schematic structure diagrams of other sample analysis systems according to embodiments of the disclosure.
Figure 14:
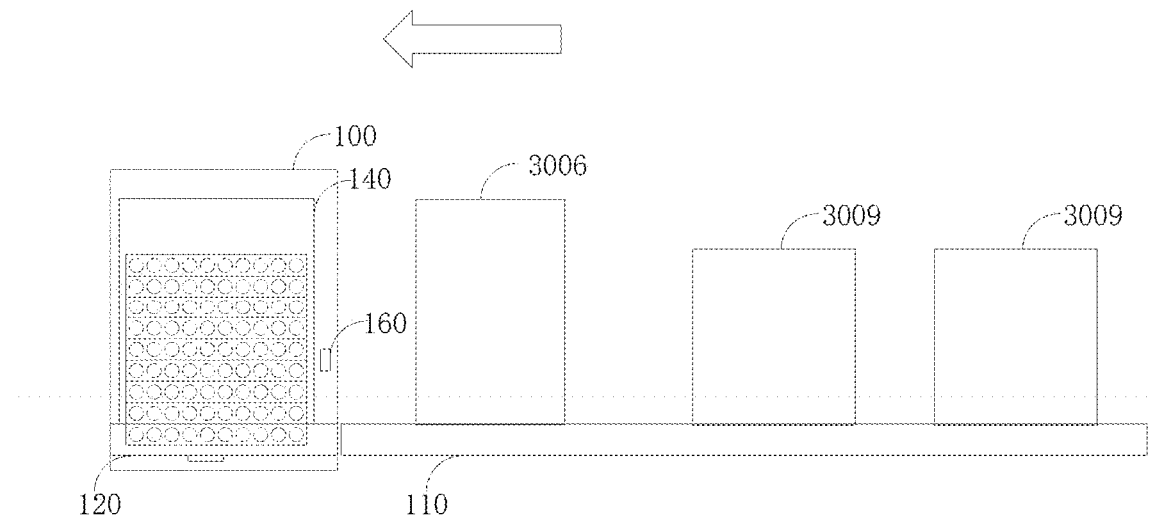

An embodiment of the disclosure further provides a sample analysis system, as shown in FIGS. 13 and 14, which comprises a plurality of sample analyzers 3009, a sample rack transport device, an unloading platform 3006, and a sample sorting device 100.

The sample rack transport device is provided with a transport track 110 and is configured to convey a sample rack with at least one sample container placed therein to at least one sample analyzer of the plurality of sample analyzers 3009 for testing. The plurality of sample analyzers 3009 and the unloading platform 3006 are sequentially arranged along a first conveying direction of the transport track 110. Here, the sample sorting device 100 is arranged upstream or downstream of the unloading platform 3006 along the first conveying direction and is configured to sort the at least one sample container in the sample rack that has been tested by the at least one of the plurality of sample analyzers.

The sample sorting device 100 comprises: a connecting track 120 parallelly connected to the transport track 110, such that the sample rack with the at least one sample container placed therein can be conveyed from the transport track 110 to the connecting track 120 and from the connecting track 120 to the transport track 110; a sorting platform 140 configured for placing at least one sample rack to load the sample container(s); and a sample transfer mechanism 160, which is arranged above the sorting platform 140, wherein the sample transfer mechanism 160 is capable of moving to a position above the connecting track 120 to transfer the sample container(s) in the sample rack, which is conveyed to the connecting track 120, to the sample rack on the sorting platform 140.

The unloading platform 3006 is configured to receive the sample rack that has been sorted by the sample sorting device 100.

In the embodiment shown in FIG. 13, the sample sorting device 100 is arranged upstream of the unloading platform 3006. In this application scenario, after being tested by the sample analyzer 3009, the sample rack with the sample container(s) is conveyed to the sample sorting device 100 by the transport track 110 for sorting the sample container(s) and the sample container(s) is(are) temporarily stored in the sample rack on the sorting platform 140 of the sample sorting device 100, while the empty sample rack after sorting is conveyed to the unloading platform 3006 by the transport track 110.

In the embodiment shown in FIG. 14, the sample sorting device 100 is arranged downstream of the unloading platform 3006. In this application scenario, after being tested by the sample analyzer 3009, the sample rack with the sample container(s) is conveyed to the sample sorting device 100 in the first conveying direction across the unloading platform 3006 by the bidirectional transport track 110 for sorting the sample container(s), and with the sample container(s) is(are) temporarily stored in the sample rack on the sorting platform 140 of the sample sorting device 100, while the empty sample rack after sorting is conveyed to the unloading platform 3006 by the bidirectional transport track 110 in a second conveying direction opposite to the first conveying direction.

In the existing sample analysis system, sample containers are directly conveyed to the unloading platform 3006 or other buffer areas after all the tests are completed. When a user needs to find a specific sample container, such as a sample container with an abnormal CRP test result or a sample container with an abnormal blood routine test result, the user has to check one by one at the unloading platform 3006, which leads to poor user experience and low efficiency.

In the embodiment of the disclosure, after sample containers are sorted in the sample sorting device upstream or downstream of the unloading platform 3006, the user can conveniently find a specific sample container, which improves the user experience and is convenient for managing tested samples.

In an embodiment of the disclosure, the sample transfer mechanism 160 may be configured to transfer sample containers in the sample rack conveyed onto the connecting track 120 that have been tested by a same sample analyzer to one and the same sample rack on the sorting platform 140.

In an embodiment of the disclosure, the sorting platform 140 may be provided with a plurality of preset feature areas, and the sample transfer mechanism 160 is configured to transfer sample containers in the sample rack conveyed onto the connecting track 120 that have been tested by a same sample analyzer to a respective one of the feature areas.

In an embodiment of the disclosure, the sample sorting device 100 may be provided with a display screen for displaying where the sample containers are located on the sorting platform 140. In this case, for example, the user can input the number of the sample container to be searched on the display screen, and then the display screen displays the position of the sample container on the sorting platform to the user, which is convenient for the user to locate the sample container to be searched. Therefore, it is more convenient for the user to manage sample containers, and the user experience is improved.

In an embodiment of the disclosure, the sample rack placed on the sorting platform 140 may be an ordinary test tube rack, for example, a test tube rack that can hold ten sample containers, or may be presented in the form of a test tube tray. An empty test tube tray can hold more sample containers, such as 50 or 100 sample containers. In this case, feature areas can be artificially defined on the empty test tube tray, that is, samples with different properties can be placed in different areas, such as a glycosylated sample area, a CRP sample area, an RET sample area, a slide sample area, a scan failure area, an abnormal sample aspiration area, etc. That is, the sample transfer mechanism 160 can transfer sample containers with a same property in sample racks conveyed to the connecting track 120 to one and the same feature area on the sorting platform 140.

In the embodiment of the disclosure, sample containers are placed by defining feature areas, so that when a user searches for a specific sample, he or she can search for the specific sample container firstly based on the area and then search for the specific sample, which further facilitates the management of sample containers by the user and improves the user experience.

In an embodiment of the disclosure, the empty test tube tray may be provided with a hand lifting or raising handle, which is convenient for the user to remove the empty test tube tray and the sample containers on the empty test tube tray altogether.

In an embodiment of the disclosure, the empty test tube tray may be provided with an identification code, such as ID, and each vacancy on the empty test tube tray may be numbered, and the number of each vacancy corresponding to the identification code of the empty test tube tray may be displayed on the display screen, which is convenient for a user to search for samples next time.

In an embodiment of the disclosure, for other features of the sample sorting system, reference may be made to the embodiments described with reference to FIGS. 1-10, and they will not be described in detail herein.

In addition, the disclosure also provides a sample analysis method, which is applied to a sample analysis system, especially to the sample analysis system shown in FIGS. 13 and 14. The sample analysis system comprises a plurality of sample analyzers 3009, a sample rack transport device, an unloading platform 3006, and a sample sorting device 100. The sample rack transport device is provided with a transport track 110 and is configured to convey a sample rack with at least one sample container placed therein to at least one sample analyzer of the plurality of sample analyzers 3009 for testing. The plurality of sample analyzers and the unloading platform 3006 are sequentially arranged along a first conveying direction of the transport track 110. The sample sorting device 100 is arranged upstream or downstream of the unloading platform 3006 along the first conveying direction and is configured to sort the at least one sample container in the sample rack that has been tested by the at least one of the plurality of sample analyzers.

Figure 15:
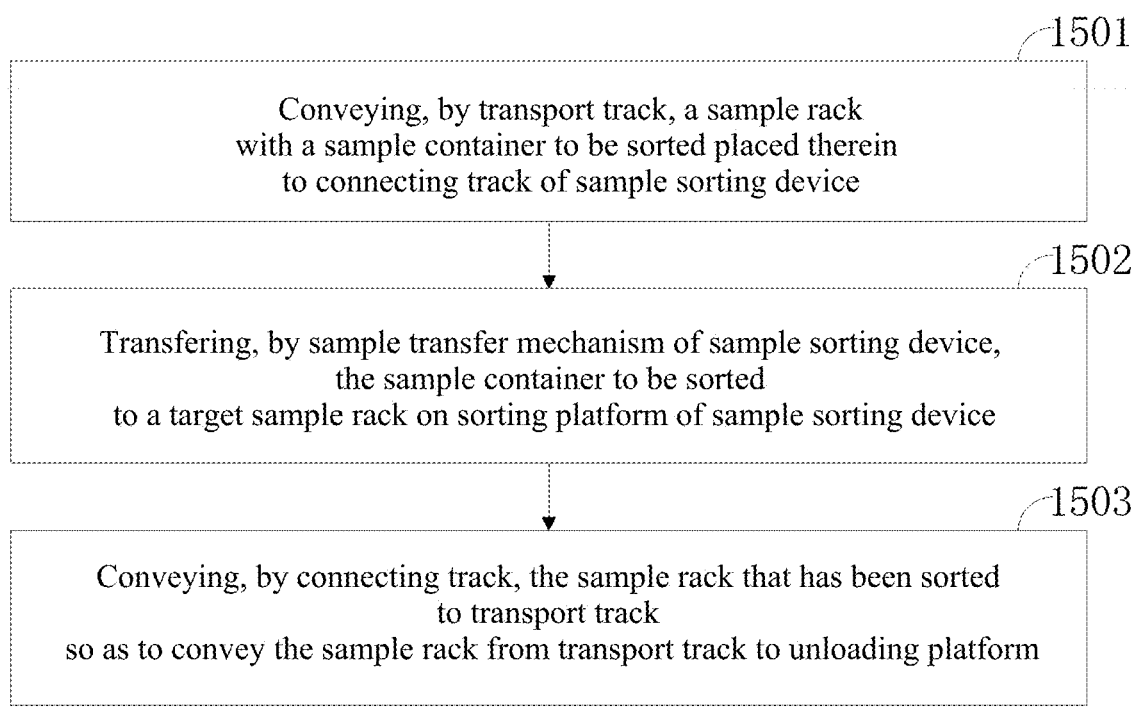
FIG. 15 is a flowchart of another sample analysis method according to an embodiment of the disclosure.

FIG. 15 is a flowchart of a sample analysis method according to the embodiment of the disclosure. As shown in FIG. 15, the sorting method comprises:
- step 1501: conveying, by the transport track 110, a sample rack with a sample container to be sorted placed therein to a connecting track 120 of the sample sorting device 100;
- step 1502: transferring, by a sample transfer mechanism 160 of the sample sorting device 100, the sample container to be sorted to a target sample rack on a sorting platform 140 of the sample sorting device 100; and
- step 1503: conveying, by the connecting track 120, the sample rack that has been sorted to the transport track 110 so as to convey the sample rack from the transport track 110 to the unloading platform 3006.

In an embodiment of the disclosure, the method may further comprise:
- providing the sorting platform 140 with a plurality of preset feature areas, and transferring, by the sample transfer mechanism 160, sample containers in the sample rack conveyed to the connecting track 120 that have been tested by a same sample analyzer to a respective one of the feature areas.

In an embodiment of the disclosure, the method may further comprise:

displaying on a display screen where the sample containers are located on the sorting platform 140.

Finally, it should be noted that the relative terms herein, such as "first" and "second", are used only to distinguish one entity or operation from another entity or operation, without necessarily requiring or implying any such actual relationship or sequence between these entities or operations. Moreover, the terms "comprise," "include" or any variation thereof are intended to cover a non-exclusive inclusion, so that a process, method, article or device that comprises a series of elements not only comprises those elements but also comprises other elements not expressly listed or further comprises elements inherent to such a process, method, article, or device. In the absence of more restrictions, the element defined by the phrase "comprising a/an . . . " does not exclude the presence of a further identical element in the process, method, article or device that comprises the element.

The features mentioned in the above specification, the drawings, and the claims can be arbitrarily combined with each other as long as the combination makes sense within the scope of the disclosure. The features and advantages described for the sample analysis system according to the disclosure are applicable to the sample analysis method according to the disclosure in a corresponding manner, and vice versa.

The above is only specific implementation of the disclosure to enable those of skill in the art to understand or implement the disclosure. Various modifications to these embodiments will be apparent to those skilled in the art. The general principles defined herein may be implemented in other embodiments without departing from the spirit or scope of the disclosure. Therefore, the disclosure will not be limited to the embodiments provided herein but should conform to the widest scope consistent with the principles and novel features disclosed herein.

The invention claimed is:

1. A sample analysis system, comprising a first sample analyzer, at least one second sample analyzer, a sample rack transport device, and a sample sorting device, wherein the first sample analyzer is a hematology analyzer;

wherein the sample rack transport device is provided with a transport track and is configured to convey a sample rack with at least one sample container placed therein to the first sample analyzer and/or the at least one second sample analyzer for testing, and the first sample analyzer and the at least one second sample analyzer are sequentially arranged along a first conveying direction of the transport track; and wherein the sample sorting device is arranged between the first sample analyzer and the at least one second sample analyzer, and the sample sorting device is located downstream of the hematology analyzer along the first conveying direction and configured to collect and sort sample containers that have been subjected to a blood test performed by the hematology analyzer and are to be conveyed to the at least one second sample analyzer; and the sample sorting device comprises:

a connecting track parallelly connected to the transport track, such that the sample rack with the at least one sample container placed therein can be conveyed from the transport track to the connecting track or from the connecting track to the transport track, a sorting platform for placing at least one target sample rack and having an entrance for the target sample rack placed on the sorting platform to enter into the connecting track or for the sample rack on the connecting track to enter into the sorting platform, a sample transfer mechanism, which is arranged above the sorting platform and is capable of moving to a position above the connecting track, so as to transfer the sample container(s) in the sample rack, which is conveyed to the connecting track, to the target sample rack on the sorting platform, and a first identifier configured for identifying the sample container(s), and the first identifier is capable of moving horizontally in synchronization with the sample transfer mechanism to identify identity information of the sample container currently transferred by the sample transfer mechanism; wherein the sample transfer mechanism is configured to place sample containers that, after being identified by the first identifier, are determined to be conveyed to a same one of the at least one second sample analyzer in a same one of the at least one target sample rack.

2. The sample analysis system of claim 1, wherein the sample sorting device further comprises a second identifier configured for identifying identity information of the sample rack, and the second identifier is arranged on one side of the entrance of the sample sorting device.

3. The sample analysis system claim 1, wherein the sample sorting device further comprises a loading mechanism configured for pushing the target sample rack on the sorting platform towards or away from the connecting track.

4. The sample analysis system of claim 1, wherein the sample transfer mechanism comprises:

a gripping mechanism configured to grip and move the sample container from the sample rack on the connecting track;

a rotary drive mechanism connected to the gripping mechanism and configured to drive the gripping mechanism together with the sample container gripped thereby to rotate about a vertical axis thereof;

a vertical drive mechanism connected to the gripping mechanism and configured to drive the gripping mechanism together with the sample container gripped thereby to move in a vertical direction;

a first support configured to mount the gripping mechanism, the rotary drive mechanism, the vertical drive mechanism, and the first identifier; and a horizontal drive mechanism connected to the first support and configured to drive the first support together with the gripping mechanism, the rotary drive mechanism, the vertical drive mechanism, and the first identifier mounted thereon to move in a horizontal direction, so that the gripping mechanism is capable of moving to a position above the connecting track to grip the sample container in the sample rack on the connecting track;

wherein the first identifier is a scanner arranged adjacent to the gripping mechanism and configured to scan and identify an identity barcode of the sample container gripped by the gripping mechanism in a scanning area thereof.

5. The sample analysis system of claim 4, wherein the gripping mechanism is constructed as a pneumatic gripping mechanism comprising a pneumatic cylinder and a pneumatic gripper connected to each other, and the pneumatic cylinder is configured to drive the pneumatic gripper to clamp or release the sample container.

6. The sample analysis system of claim 5, wherein the pneumatic gripper comprises a first pneumatic gripper and a second pneumatic gripper which are opposite to each other and connected to the pneumatic cylinder, and the pneumatic cylinder is configured to drive the first pneumatic gripper and the second pneumatic gripper to move toward or away from each other so as to clamp or release the sample container.

7. The sample analysis system of claim 1, wherein the sample sorting device further comprises an in-position detection mechanism configured for detecting whether the sample rack has been conveyed from the sorting platform to the connecting track.

8. The sample analysis system of claim 7, wherein the in-position detection mechanism comprises a contact and a detection optocoupler;
the contact is arranged on one side of the connecting track away from the sorting platform and is rotatable to enable an end portion of the contact to rotate into or out of a space above the connecting track; and
the sample rack moves from the sorting platform to the connecting track and comes into contact with the end portion of the contact, and the contact rotates and triggers the detection optocoupler.

9. The sample analysis system of claim 7, wherein the in-position detection mechanism further comprises a pushing mechanism for pushing the sample rack on the connecting track towards the sorting platform.

10. The sample analysis system of claim 1, wherein the at least one second sample analyzer comprises at least one of: a C-reactive protein analyzer, a slide staining and smearing machine or a glycosylated hemoglobin analyzer.

11. The sample analysis system of claim 1, further comprising a controller configured to:
determine whether the sample rack, which is to be conveyed from the transport track to the connecting track in the first conveying direction, contains a sample container to be conveyed to the at least one second sample analyzer; and
when it is determined that the sample rack, which is to be conveyed from the transport track to the connecting track in the first conveying direction, contains a sample container to be conveyed to the at least one second sample analyzer, control the transport track to convey the sample rack onto the connection track, stop the sample rack on the connection track, and control the sample transfer mechanism to transfer the sample container in the sample rack, which is to be conveyed to the at least one second sample analyzer, to the target sample rack on the sorting platform.

12. The sample analysis system of claim 3, wherein the loading mechanism is configured to: when a preset rule is meet, push a target sample rack on the sorting platform towards the connecting track to convey directly the target sample rack to a corresponding second sample analyzer for testing, and the preset rule comprises at least one of following cases: it is detected that at least one fully-loaded sample rack is placed on the sorting platform, a preset time is reached, or it is detected that a user triggers a start button.

13. The sample analysis system of claim 1, wherein the sample analysis system further comprises an unloading platform, and an empty sample rack after sorting by the sample sorting device is conveyed to the unloading platform by the transport track.

14. A sample analysis system, comprising a plurality of sample analyzers, a sample rack transport device, an unloading platform, and a sample sorting device, wherein the plurality of sample analyzers comprises a first sample analyzer and at least one second sample analyzer, and the first sample analyzer is a hematology analyzer;
wherein the sample rack transport device is provided with a transport track and is configured to convey a sample rack with at least one sample container placed therein to at least one of the plurality of sample analyzers for testing, the plurality of sample analyzers and the unloading platform are sequentially arranged along a first conveying direction of the transport track, and the sample sorting device is arranged upstream or downstream of the unloading platform along the first conveying direction,
wherein the sample sorting device is arranged between the first sample analyzer and the at least one second sample analyzer, and the sample sorting device is located downstream of the hematology analyzer along the first conveying direction and configured to collect and sort sample containers that have been subjected to a blood test performed by the hematology analyzer and are to be conveyed to the at least one second sample analyzer; and
the sample sorting device comprises:
a connecting track parallelly connected to the transport track, such that the sample rack with the at least one sample container placed therein can be conveyed from the transport track to the connecting track or from the connecting track to the transport track,
a sorting platform configured for placing at least one target sample rack to load the sample container(s),
a sample transfer mechanism, which is arranged above the sorting platform and is capable of moving to a position above the connecting track, so as to transfer the sample container(s) in the sample rack, which is conveyed to the connecting track, to the target sample rack on the sorting platform; and
a first identifier configured for identifying the sample container(s), and the first identifier is capable of moving horizontally in synchronization with the sample transfer mechanism to identify identity information of the sample container currently transferred by the sample transfer mechanism; wherein the sample transfer mechanism is configured to place sample containers that, after being identified by the first identifier, are determined to be conveyed to a same one of the at least one second sample analyzer in a same one of the at least one target sample rack; and
the unloading platform is configured to receive the sample rack that has been sorted by the sample sorting device.

15. The sample analysis system of claim 14, wherein the sample transfer mechanism is configured to transfer sample containers in the sample rack conveyed to the connecting track that have been tested by a same sample analyzer to a same target sample rack on the sorting platform; or
wherein the sorting platform is provided with a plurality of preset feature areas, and the sample transfer mechanism is configured to transfer sample containers in the sample rack conveyed to the connecting track that have been tested by a same sample analyzer to a respective one of the feature areas.

16. The sample analysis system of claim 14, wherein the sample sorting device is provided with a display screen configured for displaying where the sample containers are located on the sorting platform.

* * * * *